(12) United States Patent
Jacobs, II et al.

(10) Patent No.: US 10,556,309 B1
(45) Date of Patent: Feb. 11, 2020

(54) METHODS OF SUBTRACTIVELY MANUFACTURING A PLURALITY OF DISCRETE OBJECTS FROM A SINGLE WORKPIECE USING A REMOVABLE FIXATING MATERIAL

(71) Applicant: Benko, LLC, New London, NH (US)

(72) Inventors: James L. Jacobs, II, Amherst, NH (US); Chris Stahl, Hudson, NH (US)

(73) Assignee: PROTO LABS INC., Maple Plain, MN (US)

( * ) Notice: Subject to any disclaimer, the term of this patent is extended or adjusted under 35 U.S.C. 154(b) by 162 days.

(21) Appl. No.: 15/467,111

(22) Filed: Mar. 23, 2017

Related U.S. Application Data

(60) Provisional application No. 62/312,532, filed on Mar. 24, 2016.

(51) Int. Cl.
*B23Q 3/06* (2006.01)
*B23C 3/10* (2006.01)
*B29C 65/70* (2006.01)

(52) U.S. Cl.
CPC ............ *B23Q 3/061* (2013.01); *B23C 3/10* (2013.01); *B29C 65/70* (2013.01); *B23C 2220/12* (2013.01)

(58) Field of Classification Search
CPC ........ B23Q 3/061; B23C 2220/12; B23C 3/10
See application file for complete search history.

(56) References Cited

U.S. PATENT DOCUMENTS

| | | |
|---|---|---|
| 4,495,559 A | 1/1985 | Gelatt, Jr. et al. |
| 5,117,354 A | 5/1992 | Long |

(Continued)

FOREIGN PATENT DOCUMENTS

| | | |
|---|---|---|
| CN | 2112190 U | 8/1992 |
| WO | 154476 A2 | 8/2001 |

(Continued)

OTHER PUBLICATIONS

Defining Lead Time for APS Planning; http://t3.apptrix.com/syteline/Language/en-US/Other/Process/Defining_Lead_Time.htm [online][retrieved Mar. 31, 2017].

(Continued)

*Primary Examiner* — Moshe Wilensky
*Assistant Examiner* — Kyle A Cook
(74) *Attorney, Agent, or Firm* — Caldwell Intellectual Property Law

(57) ABSTRACT

Methods involving adding a removable fixating material to a partially manufactured workpiece to stabilize a plurality of partially formed objects therein for subsequent manufacturing. In one example, valleys are formed in a workpiece between adjacent partially formed objects so that interconnecting portions remain to interconnect the partially formed objects. Then, the removable fixating material is installed in the valleys, and once the removable fixating material has hardened, the workpiece is further processed to at least remove the interconnecting portions. In some embodiments, a mold is used to install the removable fixating material into the workpiece. In some embodiments, a prefabricated temporary frame is used for installing the removable fixating material into the workpiece. In some embodiments, a temporary frame is formed from the workpiece along with the plurality of objects during manufacturing.

10 Claims, 16 Drawing Sheets

(56) References Cited

U.S. PATENT DOCUMENTS

| | | |
|---|---|---|
| 5,465,221 A | 11/1995 | Merat et al. |
| 5,495,430 A | 2/1996 | Matsunari et al. |
| 5,552,995 A | 9/1996 | Sebastian |
| 5,570,291 A | 10/1996 | Dudle et al. |
| 5,655,087 A | 8/1997 | Hino et al. |
| 5,758,328 A | 5/1998 | Giovannoli |
| 5,847,971 A | 12/1998 | Ladner et al. |
| 5,870,719 A | 2/1999 | Maritzen et al. |
| 5,937,189 A | 8/1999 | Branson et al. |
| 6,031,535 A | 2/2000 | Barton |
| 6,112,133 A | 8/2000 | Fishman |
| 6,295,513 B1 | 9/2001 | Thackston |
| 6,341,271 B1 | 1/2002 | Salvo et al. |
| 6,343,285 B1 | 1/2002 | Tanaka et al. |
| 6,611,725 B1 | 8/2003 | Harrison |
| 6,647,373 B1 | 11/2003 | Carlton-Foss |
| 6,701,200 B1 | 3/2004 | Lukis et al. |
| 6,750,864 B1 | 6/2004 | Anwar |
| 6,834,312 B2 | 12/2004 | Edwards et al. |
| 6,836,699 B2 | 12/2004 | Lukis et al. |
| 6,859,768 B1 | 2/2005 | Wakelam et al. |
| 6,922,701 B1 | 6/2005 | Ananian et al. |
| 6,917,847 B2 | 7/2005 | Littlejohn et al. |
| 7,006,084 B1 | 2/2006 | Buss et al. |
| 7,058,465 B2 | 6/2006 | Emori et al. |
| 7,079,990 B2 | 7/2006 | Haller et al. |
| 7,085,687 B2 | 8/2006 | Eckenwiler et al. |
| 7,089,082 B1 | 8/2006 | Lukis et al. |
| 7,123,986 B2 | 10/2006 | Lukis et al. |
| 7,134,096 B2 | 11/2006 | Brathwaite et al. |
| 7,299,101 B2 | 11/2007 | Lukis et al. |
| 7,305,367 B1 | 12/2007 | Hollis et al. |
| 7,327,869 B2 | 2/2008 | Boyer |
| 7,343,212 B1 | 3/2008 | Brearley et al. |
| 7,359,886 B2 | 4/2008 | Sakurai et al. |
| 7,366,643 B2 | 4/2008 | Verdura et al. |
| 7,369,970 B2 | 5/2008 | Shimizu et al. |
| 7,418,307 B2 | 8/2008 | Katircioglu |
| 7,467,074 B2 | 12/2008 | Faruque et al. |
| 7,496,487 B2 | 2/2009 | Wakelam et al. |
| 7,496,528 B2 | 2/2009 | Lukis et al. |
| 7,499,871 B1 | 3/2009 | McBrayer et al. |
| 7,523,411 B2 | 4/2009 | Carlin |
| 7,526,358 B2 | 4/2009 | Kawano et al. |
| 7,529,650 B2 | 5/2009 | Wakelam et al. |
| 7,565,139 B2 | 7/2009 | Neven, Sr. et al. |
| 7,565,223 B2 | 7/2009 | Moldenhauer et al. |
| 7,567,849 B1 | 7/2009 | Trammell et al. |
| 7,568,155 B1 | 7/2009 | Axe et al. |
| 7,571,166 B1 | 8/2009 | Davies et al. |
| 7,574,339 B2 | 8/2009 | Lukis et al. |
| 7,590,466 B2 | 9/2009 | Lukis et al. |
| 7,590,565 B2 | 9/2009 | Ward et al. |
| 7,603,191 B2 | 10/2009 | Gross |
| 7,606,628 B2 | 10/2009 | Azuma |
| 7,630,783 B2 | 12/2009 | Walls-Manning et al. |
| 7,656,402 B2 | 2/2010 | Abraham et al. |
| 7,689,936 B2 | 3/2010 | Rosel |
| 7,733,339 B2 | 6/2010 | Laning et al. |
| 7,747,469 B2 | 6/2010 | Hinman |
| 7,748,622 B2 | 7/2010 | Schon et al. |
| 7,761,319 B2 | 7/2010 | Gil et al. |
| 7,822,682 B2 | 10/2010 | Arnold et al. |
| 7,836,573 B2 | 11/2010 | Lukis et al. |
| 7,840,443 B2 | 11/2010 | Lukis et al. |
| 7,908,200 B2 | 3/2011 | Scott et al. |
| 7,957,830 B2 | 6/2011 | Lukis et al. |
| 7,979,313 B1 | 7/2011 | Baar |
| 7,993,140 B2 | 8/2011 | Sakezles |
| 8,000,987 B2 | 8/2011 | Hickey et al. |
| 8,024,207 B2 | 9/2011 | Ouimet |
| 8,140,401 B2 | 3/2012 | Lukis et al. |
| 8,170,946 B2 | 5/2012 | Blair et al. |
| 8,175,933 B2 | 5/2012 | Cook, Jr. et al. |
| 8,180,396 B2 | 5/2012 | Athsani et al. |
| 8,209,327 B2 | 6/2012 | Danish et al. |
| 8,239,284 B2 | 8/2012 | Lukis et al. |
| 8,249,329 B2 | 8/2012 | Silver |
| 8,271,118 B2 | 9/2012 | Pietsch et al. |
| 8,275,583 B2 | 9/2012 | Devarajan et al. |
| 8,295,971 B2 | 10/2012 | Krantz |
| 8,417,478 B2 | 4/2013 | Gintis et al. |
| 8,441,502 B2 | 5/2013 | Reghetti et al. |
| 8,515,820 B2 | 8/2013 | Lopez et al. |
| 8,554,250 B2 | 10/2013 | Linaker |
| 8,571,298 B2 | 10/2013 | McQueen et al. |
| 8,595,171 B2 | 11/2013 | Qu |
| 8,700,185 B2 | 4/2014 | Yucel et al. |
| 8,706,607 B2 | 4/2014 | Sheth et al. |
| 8,768,651 B2 | 7/2014 | Bhaskaran et al. |
| 8,798,324 B2 | 8/2014 | Conradt |
| 8,806,398 B2 | 8/2014 | Brathwaite et al. |
| 8,830,267 B2 | 9/2014 | Brackney |
| 8,849,636 B2 | 9/2014 | Becker et al. |
| 8,861,005 B2 | 10/2014 | Grosz |
| 8,874,413 B2 | 10/2014 | Mulligan et al. |
| 8,923,650 B2 | 12/2014 | Wexler |
| 8,977,558 B2 | 3/2015 | Nielsen et al. |
| 9,037,692 B2 | 5/2015 | Ferris |
| 9,055,120 B1 | 6/2015 | Firman |
| 9,106,764 B2 | 8/2015 | Chan et al. |
| 2001/0023418 A1 | 9/2001 | Suzuki et al. |
| 2001/0047251 A1 | 11/2001 | Kemp |
| 2002/0065790 A1 | 5/2002 | Oouchi |
| 2002/0087440 A1 | 7/2002 | Blair et al. |
| 2002/0099579 A1 | 7/2002 | Stowell et al. |
| 2002/0107673 A1 | 8/2002 | Haller et al. |
| 2002/0152133 A1 | 10/2002 | King et al. |
| 2003/0018490 A1 | 1/2003 | Magers et al. |
| 2003/0054732 A1* | 3/2003 | Chiu ............... B23C 3/305 451/28 |
| 2003/0069824 A1 | 4/2003 | Menninger |
| 2003/0078846 A1 | 4/2003 | Burk et al. |
| 2003/0139995 A1 | 7/2003 | Farley |
| 2003/0149500 A1 | 8/2003 | Faruque et al. |
| 2003/0163212 A1 | 8/2003 | Smith et al. |
| 2003/0172008 A1 | 9/2003 | Hage et al. |
| 2003/0212610 A1 | 11/2003 | Duffy et al. |
| 2003/0220911 A1 | 11/2003 | Tompras |
| 2004/0008876 A1 | 1/2004 | Lure |
| 2004/0113945 A1 | 6/2004 | Park et al. |
| 2004/0195224 A1 | 10/2004 | Kanodia et al. |
| 2005/0055299 A1 | 3/2005 | Chambers et al. |
| 2005/0125092 A1 | 6/2005 | Lukis et al. |
| 2005/0144033 A1 | 6/2005 | Vreeke et al. |
| 2005/0171790 A1 | 8/2005 | Blackmon |
| 2005/0251478 A1 | 11/2005 | Yanavi |
| 2005/0273401 A1 | 12/2005 | Yeh et al. |
| 2006/0085322 A1 | 4/2006 | Crookshanks |
| 2006/0185275 A1 | 8/2006 | Yatt |
| 2006/0253214 A1 | 11/2006 | Gross |
| 2007/0016437 A1 | 1/2007 | Elmufdi et al. |
| 2007/0067146 A1 | 3/2007 | Devarajan et al. |
| 2007/0073593 A1 | 5/2007 | Perry et al. |
| 2007/0112635 A1 | 5/2007 | Loncaric |
| 2007/0198231 A1 | 8/2007 | Walch |
| 2008/0120086 A1 | 5/2008 | Lilley et al. |
| 2008/0120823 A1* | 5/2008 | Lukis .............. B23Q 3/086 29/423 |
| 2008/0183614 A1 | 7/2008 | Gujral et al. |
| 2008/0269942 A1 | 10/2008 | Free |
| 2008/0281678 A1 | 11/2008 | Keuls et al. |
| 2009/0058860 A1 | 3/2009 | Fong et al. |
| 2009/0208773 A1 | 8/2009 | DuPont |
| 2009/0299799 A1 | 12/2009 | Racho et al. |
| 2009/0319388 A1 | 12/2009 | Yuan et al. |
| 2011/0040542 A1 | 2/2011 | Sendhoff et al. |
| 2011/0047140 A1 | 2/2011 | Free |
| 2011/0104642 A1* | 5/2011 | Luksch ............ A61C 13/081 433/201.1 |
| 2011/0209081 A1 | 8/2011 | Chen et al. |
| 2011/0213757 A1 | 9/2011 | Bhaskaran et al. |
| 2012/0016678 A1 | 1/2012 | Gruber et al. |
| 2012/0072299 A1 | 3/2012 | Sampsell |

(56) References Cited

U.S. PATENT DOCUMENTS

| | | |
|---|---|---|
| 2012/0230548 A1 | 9/2012 | Calman et al. |
| 2012/0316667 A1 | 12/2012 | Hartloff |
| 2013/0055126 A1 | 2/2013 | Jackson |
| 2013/0097259 A1 | 4/2013 | Li |
| 2013/0100128 A1 | 4/2013 | Steedly et al. |
| 2013/0138529 A1 | 5/2013 | Hou |
| 2013/0144566 A1 | 6/2013 | De Biswas |
| 2013/0166470 A1 | 6/2013 | Grala et al. |
| 2013/0218961 A1 | 8/2013 | Ho |
| 2013/0293580 A1 | 11/2013 | Spivack |
| 2013/0297320 A1 | 11/2013 | Buser |
| 2013/0297460 A1 | 11/2013 | Spivack |
| 2013/0311914 A1 | 11/2013 | Daily |
| 2013/0325410 A1 | 12/2013 | Jung et al. |
| 2014/0042136 A1 | 2/2014 | Daniel et al. |
| 2014/0067333 A1 | 3/2014 | Rodney et al. |
| 2014/0075342 A1 | 3/2014 | Corlett |
| 2014/0098094 A1 | 4/2014 | Neumann et al. |
| 2014/0157579 A1 | 6/2014 | Chhabra et al. |
| 2014/0207605 A1 | 7/2014 | Allin et al. |
| 2014/0229316 A1 | 8/2014 | Brandon |
| 2014/0279177 A1 | 9/2014 | Stump |
| 2014/0379119 A1 | 12/2014 | Sciacchitano et al. |
| 2015/0055085 A1 | 2/2015 | Fonte et al. |
| 2015/0066189 A1 | 3/2015 | Mulligan et al. |
| 2015/0127480 A1 | 5/2015 | Herrman et al. |
| 2015/0234377 A1 | 8/2015 | Mizikovsky |

FOREIGN PATENT DOCUMENTS

| | | |
|---|---|---|
| WO | 171626 A2 | 9/2001 |
| WO | 2001077781 A2 | 10/2001 |
| WO | 2006086332 A2 | 8/2006 |
| WO | 2007067248 A2 | 6/2007 |
| WO | 2011139630 A1 | 11/2011 |
| WO | 2011140646 | 11/2011 |
| WO | 2013058764 A1 | 4/2013 |
| WO | 2014152396 A2 | 9/2014 |

OTHER PUBLICATIONS

"Quartiles." Mathisfun.com. Web. <https://www.mathsisfun.com/data/quartiles.html>. Archive. <https://web.archive.org/web/20170313183511/https://www.mathsisfun.com/data/quartiles.html> [online] [retrieved Mar. 31, 2017].
Wu et al. Interactive 3D Geometric Modelers with 2D UI, 2002, State University of Campinas, www.dca.fee.unicamp.br, Sao Paulo, Brazil; 2002, 8 pages.
"Upload Your Photos, Print a 3D Model with hypr3D." SolidSmack. http://www.solidsmack.com/cad-design-news/hypr3d-photo-video-3d-print/; last accessed on Oct. 13, 2015.
"123D Catch." Autodesk. http://apps.123dapp.com/catch/ [online] [retrieved Mar. 31, 2017].
Rothganger et al. "3D Object Modeling and Recognition from Photographs and Image Sequences." Toward Category-Level Object Recognition. 2006, pp. 105-126, vol. 4170 of the series Lecture Notes in Computer Science. Springer Berlin Heidelberg.
Dealer Information Systems Corporation. "Parts Inventory." http://dis-corp.com/content/agriculture/inventory/parts-inventory. [online] [retrieved Mar. 31, 2017].
EMachineShop. "Emachineshop Features." http://www.emachineshop.com/machine-shop/Features/page518.html. [online] [retrieved Mar. 31, 2017].
Retrieved from:http://www.solidworks.com/sw/products/3d-cad/manufacturing-cost-estimation-quoting.htm p. 1: Automatic Manufacturing Cost Estimation Overview; Solidworks; 2015.
Retrieved from: http://www.gom.com/fileadmin/user_upload/industries/touch_probe_fixtures_EN.pdf; Application Example: Quality Control, Online Calibration and Validation of Fixtures, Jigs and Gauges. GOM mbH, 2008.
http://citeseerx.ist.psu.edu/viewdoc/download?doi=10.1.1.194.7785&rep=rep1&type=pdf Kim, Jin Baek, and Arie Segev. "A web services-enabled marketplace architecture for negotiation process management." Decision Support Systems 40.1 (2005): 71-87.
Jaiswal, Ashutosh et al., "Design and Implementation of a Secure Multi-Agent Marketplace", Elsevier Science, pp. 1-23, Jun. 3, 2004; http://magnet.cs.umn.edu/papers/Jaiswal04cera.pdf.
http://www.computer.org/csdl/proceedings/hicss/2005/2268/01/22680038.pdf Bui, Tung, and Alexandre Gachet. "Web services for negotiation and bargaining in electronic markets: Design requirements and implementation framework." System Sciences, 2005. HICSS'05. Proceedings of the 38th Annual Hawaii International Conference on. IEEE, 2005.
http://www.bridgelinedigital.com/File%20Library/Repository/eCommerce/Sample-eCommerce-RFP-Template_Bridgeline-Digital.pdf. Sample RFP Template: Ecommerce Platform, Bridgeline Digital, 2014.
Matchbook, Tealbook, http://www.matchbookinc.com/ Sep. 28, 2015.
3Diligent, Source Smarter, http://www.3diligent.com/customer.html; Sep. 28, 2015.
Dassault Systemes, Brochure, Mar. 24, 2010: New Features Type3ToCatia http://www.type3.us/content/download/2202/405535/file/New%20Feature_Type3ToCatia_2010 _US%20old.pdf.
Xue, S., X. Y. Kou, and S. T. Tan. "Natural voice-enabled CAD: modeling via natural discourse." Computer-Aided Design and Applications 6.1 (2009): 125-136.
Kou, X. Y., S. K. Xue, and S. T. Tan. "Knowledge-guided inference for voice-enabled CAD." Computer-Aided Design 42.6 (2010): 545-557.
Sharma, Anirudh, et al. "MozArt: a multimodal interface for conceptual 3D modeling." Proceedings of the 13th international conference on multimodal interfaces. ACM, 2011.
Sorpas ("User Manual,", Swanted Software and Engineering Aps, 2011 (120 pages)).
Kalpakjian, S. and Schmid, S., *Manufacturing Processes for Engineering Materials*, 5$^{th}$ Ed. Pearson (Jul. 27, 2007).
Wang and Bourne, *Design and Manufacturing of Sheet Metal Parts: Using Features to Aid Process Planning and Resolve Manufacturability Problems*, Robotics and Computer-Integrated Manufacturing, vol. 13, No. 3, pp. 281-294 (1997).
U.S. Appl. No. 14/267,447, Aug. 5, 2015, Office Action.
U.S. Appl. No. 14/197,922, Nov. 26, 2014, Office Action.
U.S. Appl. No. 14/197,922, Apr. 27, 2015, Response to Office Action.
U.S. Appl. No. 14/197,922, May 15, 2015, Office Action.
U.S. Appl. No. 14/267,447, Jun. 18, 2015, Response to Office Action.
U.S. Appl. No. 14/263,665, Oct. 8, 2015, Office Action.
U.S. Appl. No. 14/053,222, Jan. 29, 2016, Office Action, now U.S. Pat. No. 9,606,701.
U.S. Appl. No. 14/311,943, Apr. 27, 2016, Office Action.
U.S. Appl. No. 14/486,550, May 26, 2016, Office Action.
U.S. Appl. No. 14/060,033, Jun. 15, 2016, Office Action.
U.S. Appl. No. 14/172,462, Jul. 6, 2016, Office Action.
U.S. Appl. No. 14/053,222, Jul. 29, 2016, Response to Office Action.
U.S. Appl. No. 14/185,204, Jul. 29, 2016, Office Action.
U.S. Appl. No. 14/062,947, Sep. 16, 2016, Office Action.
U.S. Appl. No. 14/457,758, Sep. 30, 2016, Office Action.
U.S. Appl. No. 14/457,758, Mar. 29, 2017, Response to Office Action.
U.S. Appl. No. 14/195,391, Oct. 18, 2017, Office Action.
U.S. Appl. No. 14/172,404, Oct. 20, 2017, Office Action.
U.S. Appl. No. 14/275,116, Dec. 28, 2016, Office Action.
U.S. Appl. No. 14/303,372, Jan. 11, 2017, Office Action.
U.S. Appl. No. 14/246,254, Jan. 11, 2017, Office Action.
U.S. Appl. No. 14/229,008, Jan. 13, 2017, Office Action.
U.S. Appl. No. 14/060,033, filed Oct. 22, 2013.
U.S. Appl. No. 14/053,222, filed Oct. 14, 2013, U.S. Pat. No. 9,606,701.
U.S. Appl. No. 14/172,462, filed Oct. 16, 2013.
U.S. Appl. No. 14/062,947, filed Oct. 25, 2013.
U.S. Appl. No. 14/172,404, filed Feb. 4, 2014.

(56) References Cited

OTHER PUBLICATIONS

U.S. Appl. No. 14/303,372, filed Jun. 12, 2014.
U.S. Appl. No. 14/185,204, filed Feb. 20, 2014.
U.S. Appl. No. 14/195,391, filed Mar. 3, 2014.
U.S. Appl. No. 14/246,254, filed Apr. 7, 2014.
U.S. Appl. No. 14/229,008, filed Mar. 28, 2014.
U.S. Appl. No. 14/197,922, filed Mar. 5, 2014.
U.S. Appl. No. 14/263,665, filed Apr. 28, 2014.
U.S. Appl. No. 14/267,447, filed May 1, 2014.
U.S. Appl. No. 14/311,943, filed Jun. 23, 2014.

* cited by examiner

US 10,556,309 B1

METHODS OF SUBTRACTIVELY MANUFACTURING A PLURALITY OF DISCRETE OBJECTS FROM A SINGLE WORKPIECE USING A REMOVABLE FIXATING MATERIAL

RELATED APPLICATION DATA

This application claims the benefit of priority of U.S. Provisional Patent Application Ser. No. 62/312,532, filed on Mar. 24, 2016, and titled "METHODS OF SUBTRACTIVELY MANUFACTURING A PLURALITY OF DISCRETE OBJECTS FROM A SINGLE WORKPIECE USING A REMOVABLE FIXATING MATERIAL," which is incorporated reference herein in its entirety.

FIELD OF THE INVENTION

The present invention generally relates to the field of subtractive manufacturing. In particular, the present invention is directed to methods of subtractively manufacturing a plurality of discrete objects from a single workpiece using a removable fixating material.

BACKGROUND

Many types of objects are manufactured using rotary-tool milling and other types of subtractive manufacturing processes. Typically, a single object is made from a single body of material, or "workpiece," such as a block or slab of steel or aluminum. For example, steel and aluminum parts for any of a wide variety of assemblies are often machined from individual workpieces using one or more milling machines. However, making such machined parts can be labor intensive as operators load and unload individual workpieces to and from milling machines.

SUMMARY OF THE DISCLOSURE

A method of manufacturing a plurality of discrete objects from a body of material having a first side and a second side spaced from the first side, wherein the discrete objects are defined by through-spaces in the body of material extending from the first side to the second side after performing the method, the method comprising: forming, by subtractive manufacturing, valleys in the body of material on the first side of the body of material so as to leave interconnecting portions of the body of material that interconnect the plurality of objects to one another, wherein the valleys form portions of the through spaces, wherein the forming of the valley and interconnecting portions transforms the body of material into a workpiece of interconnected structures comprising precursors to the discrete objects; installing a removable fixating material into the valleys and surrounding each of the discrete objects so as to form a stabilized workpiece; after the fixating material has hardened, removing, using subtractive manufacturing to remove the interconnecting portions of the stabilized workpiece; and after removing the interconnecting portions, removing the removable fixating material so as to liberate the plurality of objects from one another.

A method of manufacturing a plurality of discrete objects from a body of material having a first side and a second side spaced from the first side, wherein the discrete objects are defined by through-spaces in the body of material extending from the first side to the second side after performing the method, the method comprising: forming, by subtractive manufacturing, valleys in the body of material on the first side of the body of material so as to leave interconnecting portions of the body of material that interconnect the plurality of objects to one another, wherein the valleys form portions of the through spaces, wherein the forming of the valley and interconnecting portions transforms the body of material into a workpiece of interconnected structures comprising precursors to the discrete objects; locating a temporary frame surrounding an object region of the body from which all of the discrete objects will be manufactured; installing a removable fixating material into the valleys so as to laterally surround the discrete objects and be in contact with the temporary frame so as to form a stabilized workpiece; after the fixating material has hardened, removing, using subtractive manufacturing to remove the interconnecting portions of the stabilized workpiece; and after removing the interconnecting portions, removing the removable fixating material so as to liberate the plurality of objects from one another.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

Figure 1:
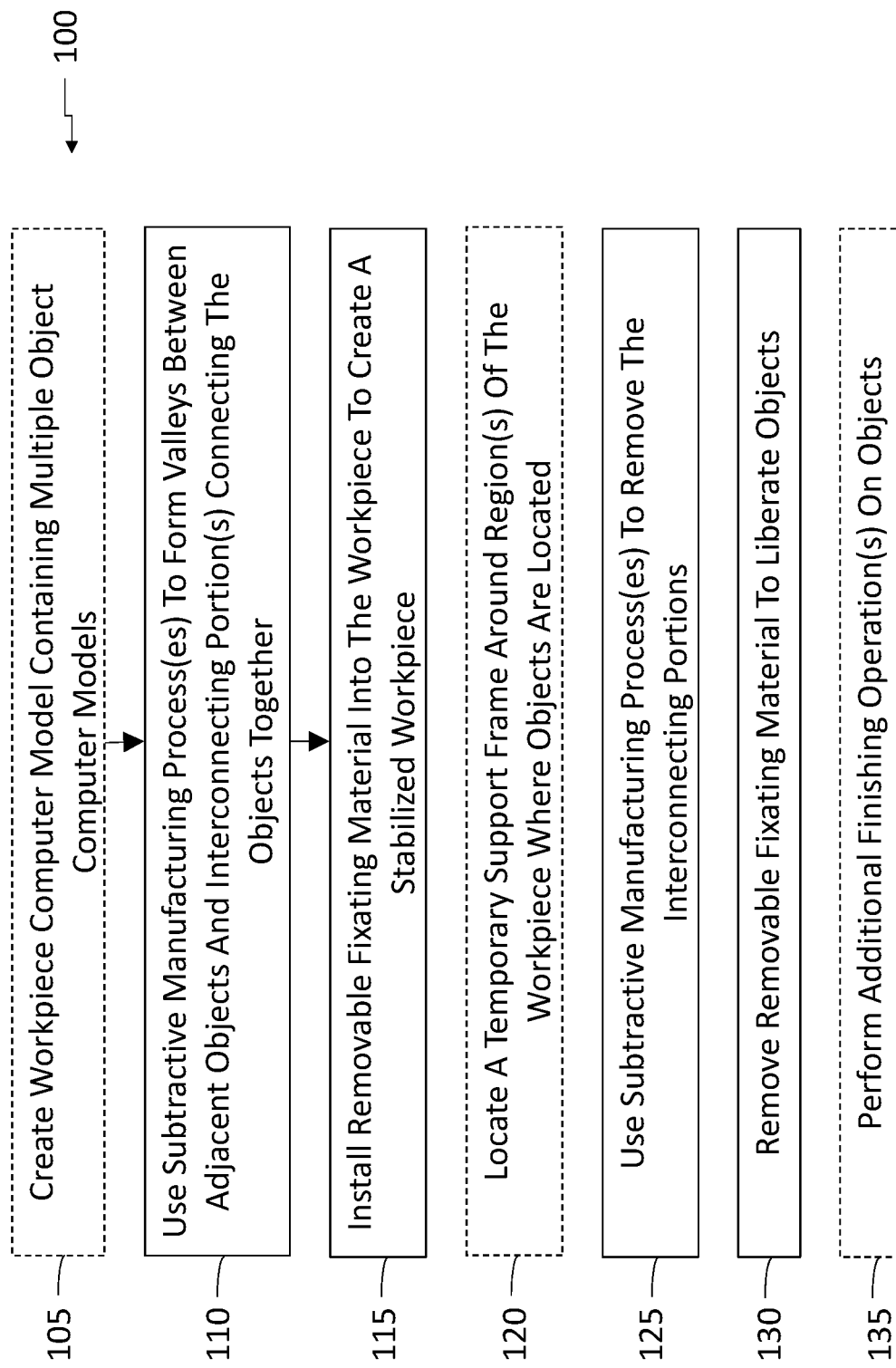
FIG. 1 is a flow diagram illustrating an exemplary method of manufacturing a plurality of discrete objects from a single workpiece in accordance with the present invention.

In one aspect, the present invention is directed to methods of manufacturing a plurality of discrete objects from a single body of material, or "workpiece," using a temporary fixating material to firmly hold the discrete objects in place while they are being disconnected from one another using one or more subtractive manufacturing processes. In some embodiments, a temporary peripheral frame is provided, for example, to aid in: handling; datum referencing; and/or object layout, among other things. Examples of discrete objects that can be manufactured using techniques disclosed herein include, but are not limited to, finished parts for assemblies (such as consumer products, military equipment, commercial equipment, among others), precursors to finished parts (such as precursors that required further processing to create finished assembly parts), finished standalone products, and precursors to finished standalone products, among others. Generally, the only limitations on the nature and character of the discrete objects is that they are manufactureable by one or more subtractive manufacturing processes and are compatible with other steps of processes described below, such as with the processes of installing and removing of a fixating material used to temporarily fix the discrete parts relative to one another and/or relative to the temporary peripheral frame. It is noted that for any given body of material, the multiple discrete parts may all be identical to one another or they may all be different from one another or some may be identical and others may be different. As used herein and in the appended claims, a "precursor" to a finished part or finished object is a discrete object, i.e., an object liberated from the body of material from which it is made, that requires further processing to become the finished part or finished object.

Examples of bodies of material from which the multiple discrete objects can be made include, but are not limited to, plates, slabs, blooms, billets, boards, blocks, among many other shapes, including curvilinear and multisided shapes, and any combination thereof. As for the material composing the body, the material may be any suitable material, such as metal (solid, sintered, etc.), polymer (solid, foamed, etc.), wood, composite, and multilayer material, among others. Fundamentally, there is no limitation on the composition of the body of material other than it be compatible with the selected subtractive manufacturing process(es) and the removable fixating material and its removal technique(s). Body of material may include at least one reference datum designed, configured, and located for precisely locating a stabilized workpiece relative to a subtractive manufacturing machine.

Each subtractive manufacturing process used may be any suitable process, such as, but not limited to, rotary-tool milling, electronic discharge machining, ablation, etching, erosion, cutting, and cleaving, among others. Fundamentally, there is no limitation on the type of subtractive manufacturing process(es) used other than each is compatible with composition of the body of material and/or the fixating material, depending on when a particular subtractive manufacturing process is used in the overall method. For example, differing subtractive manufacturing processes can be used before and after the fixating material has been installed, such that the subtractive machining process used prior to installing the fixating material does not need to be compatible with the fixating material, whereas each subtractive manufacturing process after the fixating material has been installed may need to be compatible with the fixating material, for example, if it is used to remove any of the fixating material, incidentally or intentionally.

If rotary-tool milling is utilized, this milling may be accomplished using any suitable type of milling equipment, such as milling equipment having either a vertically or horizontally oriented spindle shaft. Examples of milling equipment include bed mills, turret mills, C-frame mills, floor mills, gantry mills, knee mills, and ram-type mills, among others. In some embodiments, the milling equipment used for removing material may be of the computerized numerical control (CNC) type that is automated and operates by precisely programmed commands that control movement of one or more parts of the equipment to effect the material removal. CNC machines, their operation, programming, and relation to computer aided manufacturing (CAM) tools and computer aided design (CAD) tools are well known and need not be described in detail herein for those skilled in the art to understand the scope of the present invention and how to practice it in any of its widely varying forms.

Referring now to the drawings, FIG. 1 illustrates an exemplary method 100 of making a plurality of discrete objects from a suitable body of material. In optional step 105, a workpiece computer model may be created by assigning a plurality of computer models of one or more differing structures to locations within a computer model of the body of material. Optional Step 105 may be performed in any suitable manner, such as using CAD and/or CAM software having a graphical user interface that allows a user to manipulate graphical representations of the objects and/or body of material to effectively place the graphical representations of the objects within the graphical representation of the body of material to indicate the regions within the body of material from which the objects will be made. In step 105, the computer models of the objects are located relative to the computer model of the body of material so that sufficient space is present between adjacent ones of the computer models of the objects so that when the objects are being formed from the body of material, there is sufficient room for the subtractive manufacturing tool(s) needed to remove material from the body of material and to allow a sufficient amount of fixating material to be present between the discrete objects to provide the necessary firm support for the objects during later steps of method 100. As part of step 105 or as part of a separate step not specifically enumerated in FIG. 1, a workpiece computer model may be configured into a CAM model that in later steps of method 100 will be used to guide the operation of one or more subtractive manufacturing machines to perform the necessary material removal for ultimately forming the discrete objects from the body of material in the proper number and sequence of steps.

In step 110, one or more subtractive manufacturing processes are used to remove material from the body of material, now a workpiece, in the inter-object regions, i.e., from between the regions of the body of material that will become the objects. It is noted, that a support frame or a temporary support frame may also be formed by one or more subtractive manufacturing process prior to or during step 110. Not all of the material in the inter-object regions is removed in step 110, however. Rather, material from the inter-object regions is removed to an extent less than an extent that would sacrifice stability of the partially formed discrete objects during continuing subtractive manufacturing operations and/or any handling or other operations that may occur. The amount of material left in the inter-object regions as interconnecting portions that act to stabilize the partially formed discrete objects may take any suitable form, such as discrete bridging or continuous bridging. In discrete bridging, the subtractive manufacturing includes removing material through the entire thickness of the body of material in some locations but not others (where the bridges are formed). In continuous bridging, material is removed from the inter-object regions only to a depth less than the full thickness of the body of material. When continuous bridging is present, when the body of material is viewed from its side opposite from which the subtractive manufacturing at step 110 is performed, the body of material looks undisturbed.

In step 110, the subtractive manufacturing that removed material from the inter-object regions on one side of the body of material can be described as forming valleys in the body of material. While it can be beneficial that the material remaining after performing step 110 has a uniform thickness as described below, the remaining material may have varying thickness, for example to accommodate objects of differing sizes and/or to span differing inter-object distances while providing the needed support, among other things. At the end of step 110 after the formation of the valleys, the body of material may be referred to as a "workpiece of interconnected structures" that comprises precursors to the discrete objects interconnected with one another and connected to an integral temporary frame (see below), if used.

In step 115, a temporary and removable fixating material is installed into the workpiece of interconnected structures after step 110 so as to create a stabilized workpiece. A purpose of the removable fixating material is to temporarily firmly support, i.e., stabilize, the precursors to the discrete objects during one or more subtractive manufacturing processes that will be used to remove the interconnecting portions formed at step 110 and any additional material, if any, from the workpiece of interconnected structures desired to finish each discrete object to a desired state before being liberated from the removable fixating material.

Examples of removable fixating materials suitable for use as removable fixating material in step 115 include waxes (such as machining waxes available from Freeman Manufacturing & Supply Company, Avon, Ohio) that are melted for installation and removal but are sufficiently firm at subtractive manufacturing ambient temperatures and other materials that can be installed in a fluid form and harden when needed to provide the requisite firm support and can be removed without damaging the discrete objects, such as by melting, dissolving by water or other fluid, etc. Fundamentally, there is no limitation on the removable fixating material other than it and its removal process should not damage the objects formed from the body of material. In some embodiments, the removable fixating material may be installed by locating the workpiece of interconnected structures, after step 110, in a mold designed and configured for installing the removable fixating material in a manner that the ones of the partially formed objects in the body of material on the peripheral edge of the body of material are laterally or vertically surrounded by the removable fixating material or laterally and vertically surrounded by the removable fixating material. As an example, for a body of material that is a rectangular slab and the slab containing the plurality of partially formed objects at least roughly has the same rectangular shape, the mold may have a rectangular recess that is larger than the slab. In this example, the rectangular recess first receives the partially manufactured slab centered within the recess, and then the removable fixating material is installed to not only fill or partially fill the valleys created by the subtractive manufacturing at step 110 but also at least partially fill the space between the walls of the rectangular recess of the mold and the partially manufactured slab. After the removable fixating material hardens, the slab, now stabilized and at least partially encased in the removable fixating material, is removed from the mold for further processing.

As an alternative to the molding approach to installing the removable fixed material, at optional step 120 a temporary frame may be located laterally around the region of the body of material from which the discrete objects will be formed. The temporary frame may be provided for any one or more of a variety of purposes, including, but not necessarily limited to, providing a mold of sorts for the installation of the removable fixating material, providing a structure to aid handling of stabilized body of material, and providing one or more datum points or surfaces needed by the one or more subtractive manufacturing processes to ensure that the objects are manufactured properly. If used, a temporary frame may be provided in any of several ways.

For example, the temporary frame may be formed from the body of material by subtractive manufacturing in conjunction with the formation of the discrete objects from the body of material. It is emphasized that optional step 120 may occur prior to or during step 110 of method 100. Also, valleys may be formed in on a second side in the body of material by subtractive manufacturing. If provided in this manner, the temporary frame may be provided with any one or more of a variety of features, as needed, to effect a robust connection between the frame and the removable fixating material so as to hold the frame firmly in place during subsequent manufacturing, handling, and any other operation(s). In some embodiments in which the temporary frame is, effectively, fabricated from the body of material, the frame may be modeled in a computer model and represented by a graphical representation along with the graphical representations of the objects to be made from a particular body of material. When the temporary frame is computer modeled, the dimensions of the outer perimeter of the temporary frame may be selected to match, or nearly match, the dimensions of the outer perimeter of the body of material so as to maximize the size of the region within the temporary frame from which the objects will be formed. In some embodiments intended for use when the body of material may be any one of a preselected set of bodies of material, a library of computer models of differing temporary frames suited to the differing bodies of material may be provided. The temporary frames of the differing computer models may differ in any one or more of a number of ways, such as dimensions of the outer perimeter, thickness, shape of the outer perimeter, width, and interlock features for accommodating the removable fixating material, among others.

As another example of providing a temporary frame at optional step 120, the temporary frame may be provided as a prefabricated structure separate and distinct from the body of material from which the objects are formed. In this example, the prefabricated temporary frame has an inner periphery that is larger than the outer periphery of the body of material, or the portion of the body of material that remains after performing the subtractive manufacturing at step 110 described above. In some embodiments, the prefabricated temporary frame is provided after the subtractive manufacturing performed at step 110 and before the removable fixating material is installed at step 115. Such a discrete prefabricated temporary frame may have any of the characteristics described above relative to the integral temporary frame described above and/or may be one of a set of discrete temporary frames especially designed and configured to particular uses in the same manner as the set of temporary frames described above in the context of the computer models used for temporary frames integrally formed with corresponding respective bodies of material. Providing a discrete temporary frame can have the advantage of allowing more objects to be made from any given body of material because a portion of the body of material does not need to be used for an integrally formed frame. A discrete temporary frame may be reusable and/or may be made of a material different from the material of the body of material from which the objects are made, such as a less-expensive body of material. Providing a discrete temporary frame also cuts down on the waste created by needing to discard (recycle) an integrally fabricated temporary frame, which is not needed after it fulfils its temporary support purposes.

In step 125, subtractive manufacturing is performed on the stabilized workpiece to at least remove the interconnecting portions of the original body of material that connect the objects together with one another or to an integrally formed temporary frame, if any, that were formed in the subtractive manufacturing of step 110. Removing these interconnecting portions results in the objects, and temporary frame if present, to become discrete structures held together by only the removable fixating material. As eluded to above, an efficient example of performing step 125 is present when the side (reverse side) of the body of material opposite the side (obverse side) from which the valleys of step 110 are formed must be processed to remove a uniform thickness across that entire side in the region of the objects. Such a situation might occur, for example, when one or more faces of the objects are located at a minimum depth from the raw face of the body of material on that side. In this case, the thickness of the interconnecting portions formed in step 110 may be made to be equal to or less than that minimum depth. Then, to remove the interconnecting portions and perhaps also at least partially finish each of the objects from the obverse side of the stabilized body of material, one subtractive manufacturing operation may be to remove a uniformly thick region of material from the entire reverse side of the stabilized body of material that removes the interconnecting portions and material from each of the precursors to the objects as a step toward finishing each of the objects.

By removing the interconnecting portions, the precursors (objects), and any integral support frame, become discrete structures held together only by the removable fixating material. It is noted that the uniform-thickness material removal from the reverse side of the stabilized workpiece is only an example. The interconnecting portions remaining from step 110 can be removed in any suitable or desired manner. For example, the interconnecting portions may be removed from the reverse side without removing any material of the precursors located over any of the objects. As another example, if some but not all of the objects require material removal from the reverse side, that material may be removed along with the removal of the interconnecting portions. If the interconnecting portions are not continuous with one another at the valleys, the individual interconnecting portions may be removed without affecting any surrounding material or in conjunction with removing material over one or more, but fewer than all, of the objects. Fundamentally, there is no limitation on the manner in which subtractive manufacturing is used to remove the bridging to form the discrete objects.

After the removal of the interconnecting portions and any other material from the reverse side of the stabilized workpiece at step 125, in step 130 the removable fixating material is removed using any process suitable for the type of removable fixating material that needs to be removed. For example, if the removable fixating material is wax, wax-based, thermoplastic, or thermoplastic-based, the removal process may involve heating the removable fixating material to a temperature above its melting temperature and allowing the molten material to flow out of the stabilized body of material. As another example, if the removable fixating material is made of a material dissolvable in water or other liquid, the removal process may involve submerging the stabilized body of material in a bath of such liquid or spraying the stabilized body of material with such liquid, among other things. Once the removable fixating material has been removed, the discrete object and frame, if any, are physically liberated from one another and can be handled accordingly. If a temporary frame is present, it may be saved and used again or it may be discarded (recycled), as desired. This is so regardless of whether the temporary frame was integrally formed from the body of material or originally provided as a discrete structure.

At optional step 135, each of the discrete objects liberated from the stabilized body of material at step 130 may be further processed as desired to finish that object. Examples of further process include but are not limited to: secondary machining, polishing, coating, silk-screening, and any combination thereof, among others. Fundamentally, there is no limitation on the finishing steps, if any, that may occur at optional step 135.

In the foregoing method, the transitions between steps and/or locations at which the steps are performed may vary from one instantiation to another. For example, in an instantiation in which a milling machine, such as a CNC milling machine having a movable horizontal x-y bed and a rotational milling tool that moved in the z (vertical) direction, once a CAM model of the body of material containing the objects and the frame, if any, has been provided to the milling machine and the body of material is properly located for machining by the CNC milling machine, the machine may be controlled to perform step 110 of method 100 so as to form the valleys on the obverse side of the body of material and leave the modeled bridging to hold the objects and temporary frame, if any, together. Once the CNC milling machine has completed step 110, one or more workers, robot, or other machine may move the partially milled body of material to a separate workstation for installation of the removable fixating material. However, the partially milled body of material need not be moved to another workstation in alternative instantiations. For example, in some instantiations, the partially milled body of material may remain on the horizontal x-y bed of the CNC milling machine, where a worker, robotic arm, etc., could install the removable fixating material at step 115. In addition, if the removable fixating material is installed without moving the milled body of material, means could be provided to assist with hardening of the fixating material, such as by providing cooling if hardening happens through cooling of the fixating material.

Once the removable fixating material has hardened sufficiently, if the now stabilized body of material is located away from the CNC milling machine, it is moved to the CNC milling machine so that the milling machine can perform the subtractive manufacturing of step 125 on the reverse side of the stabilized body of material. If the CNC milling machine can perform machining from only one side, then the stabilized body of material will need to be in a flipped orientation relative to its orientation during the milling operations of step 110. However, if the facilities are such that the installation of the fixating material occurs without moving the body of material from its location where the subtractive manufacturing of step 110 occurred, then if the CNC milling machine at issue can mill from only one side of the body of material, then after installation of the fixating material the stabilized body of material must be flipped for milling on the reverse side at step 120. If the CNC milling machine is capable of milling from two opposite sides of a workpiece, then the stabilized body of material may not need to be moved at all after the removable fixating material has been installed. After the CNC milling machine has performed all milling operations of step 120, the stabilized body of material, now with the objects and temporary frame, if any, held together only by the removable fixating material, may be moved to a workstation where the fixating material is removed to liberate the objects and temporary frame, if any, from the stabilized body of material.

Some or all of the steps of method 100 and/or intermediate handling steps between the steps of method 100 may be automated to reduce the need for human interaction and contribution and associated costs. Such automation may be implemented using a work cell approach, wherein multiple steps are performed by one or more multitask or a set of single-task work-cell machines and one or more manipulators, as needed, to move a workpiece among the work-cell machines. Alternatively, the automation may be implemented using an assembly-line approach, wherein two or more single and/or multitask machines form an assembly line with suitable automated and/or manual conveyance means (e.g., conveyor belts, robots, dollies, push carts, etc.) for moving each workpiece from one machine to the next. Additionally, method 100 is exemplary and a person of ordinary skill in the art will, after reading this disclosure in its entirety will readily appreciate that method 100 may occur in a different order than show here.

Figure 2:
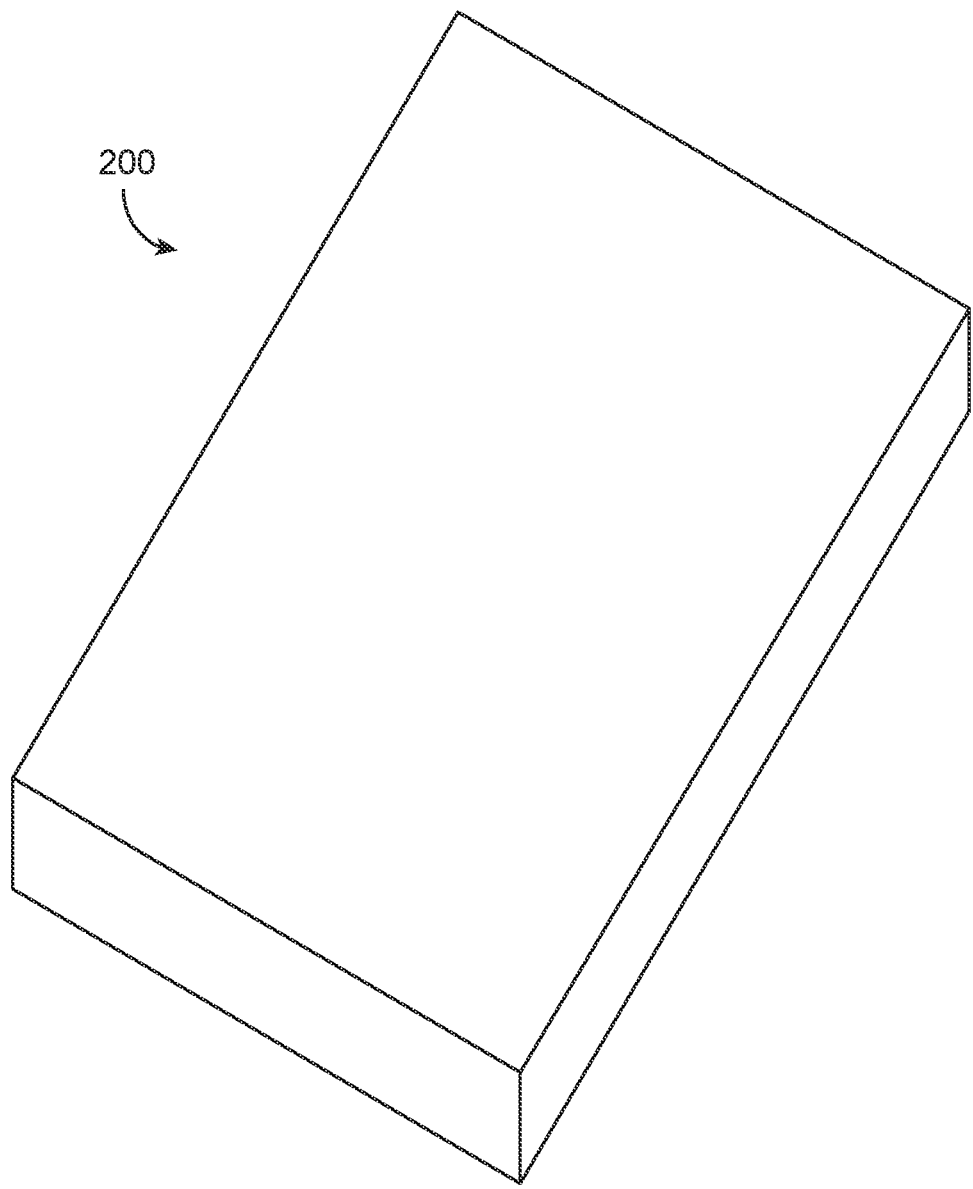
FIG. 2 is a perspective view of an exemplary body of material prior to forming a plurality of discrete objects from the body of material.

FIGS. 2 to 15 illustrate several examples of various steps of method 100 of FIG. 1 for three exemplary scenarios, namely, a frameless scenario, a prefabricated-frame scenario, and an integral-frame scenario. In each of these examples, the body of material used is a rectangular slab 200 of aluminum as illustrated in FIG. 2. The configuration of slab 200 and its composition are merely exemplary and should in no way be considered limiting. It is noted that throughout FIGS. 3A to 15, each and every occurrence of elements such as certain valleys, spaces, and interconnecting portions are not labeled for convenience and to avoid cluttering the figures. However, at least some are labeled, and those skilled in the art will readily understand where these elements exist though they are unlabeled.

Figure 3A:
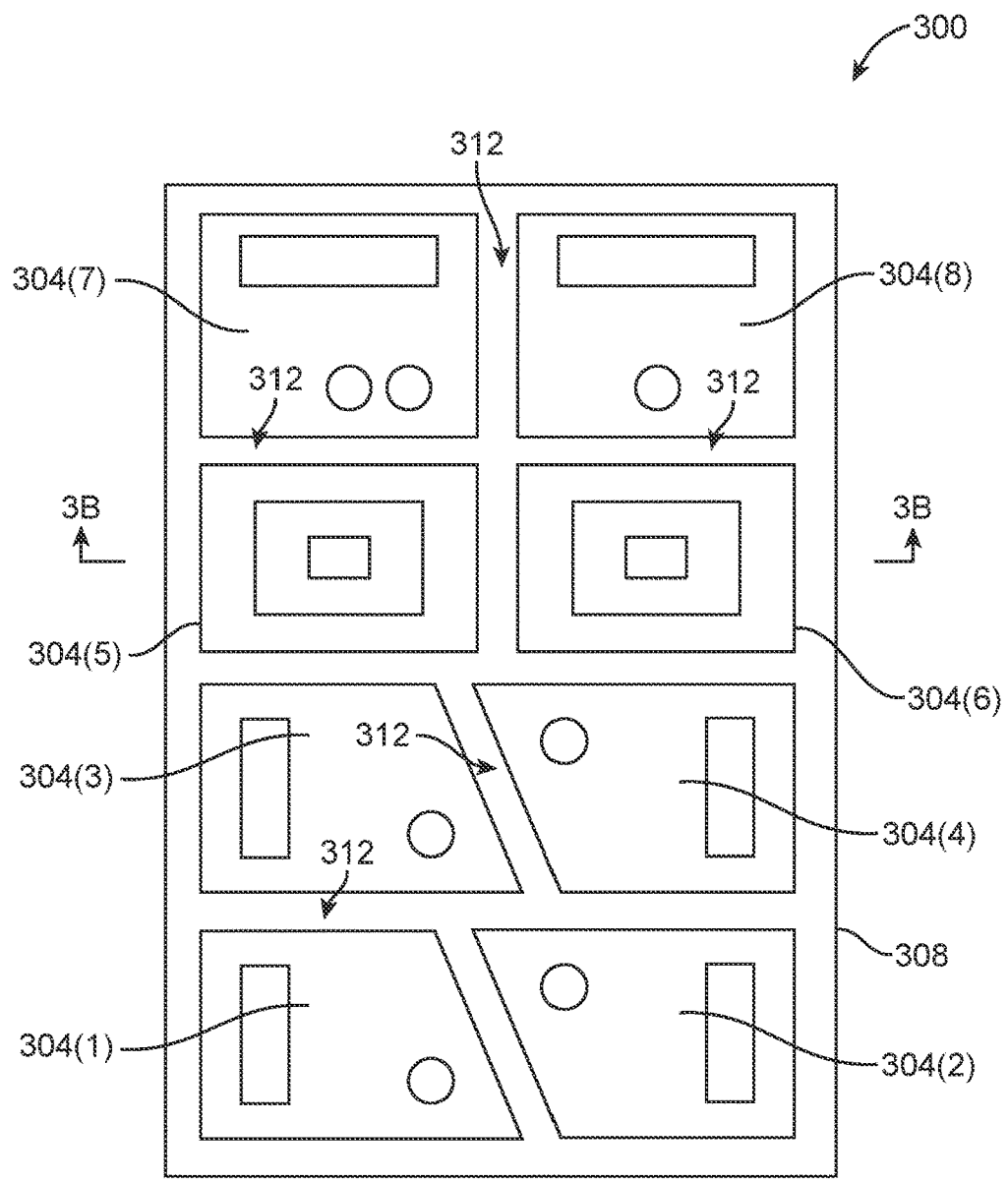
FIG. 3A is a plan view of a computer model of a workpiece composed of a computer model of the rectangular slab of FIG. 2 and multiple computer models of several types of objects to be formed from the rectangular slab.
Figure 3B:
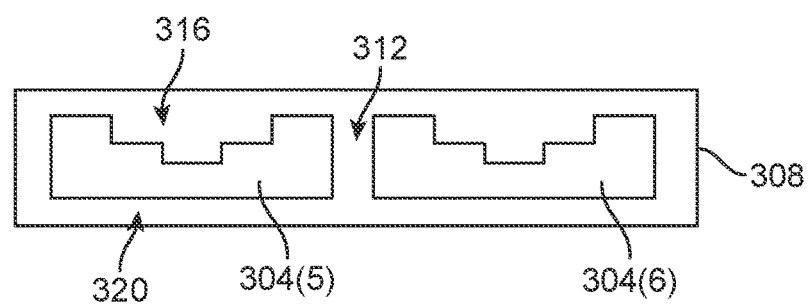
FIG. 3B is a cross-sectional view as taken along line 3B-3B of FIG. 3A.

Looking first at a frameless scenario, FIGS. 3A and 3B illustrates an exemplary workpiece computer model 300 of a workpiece 400 (FIGS. 4A and 4B) created at step 105 of FIG. 1 by placing a plurality of computer models 304(1) to 304(8) in relation to a computer model 308 of rectangular slab 200 of FIG. 2 to show where the corresponding objects will be subtractively manufactured from the rectangular slab. In this example, object computer models 304(1) to 304(4) are of a first type of object, object computer models 304(5) and 304(6) are of a second object type different from the first object type, and object computer models 304(7) and 304(8) are for a third object type different from each of the first and second object types. As seen in FIG. 3A, object computer models 304(1) to 304(8) are spaced apart to form inter-object regions 312, which are regions from which material of rectangular slab 200 (FIG. 2) will be removed to form the corresponding objects. In this example, and as seen in FIG. 3B, at least object computer models 304(5) and 304(6) require removal of additional material above and below them in regions 316 and 320 to complete the corresponding objects, at least at this stage of manufacture. It is emphasized that the objects in this example are highly simplified for illustrative purposes only. Each object in real-world embodiments may be a simple or as complex as necessary. Also, it is noted that computer models 300, 304(1) to 304(8), and 308 are simplified line drawings for purposes of explanation.

Figure 4A:
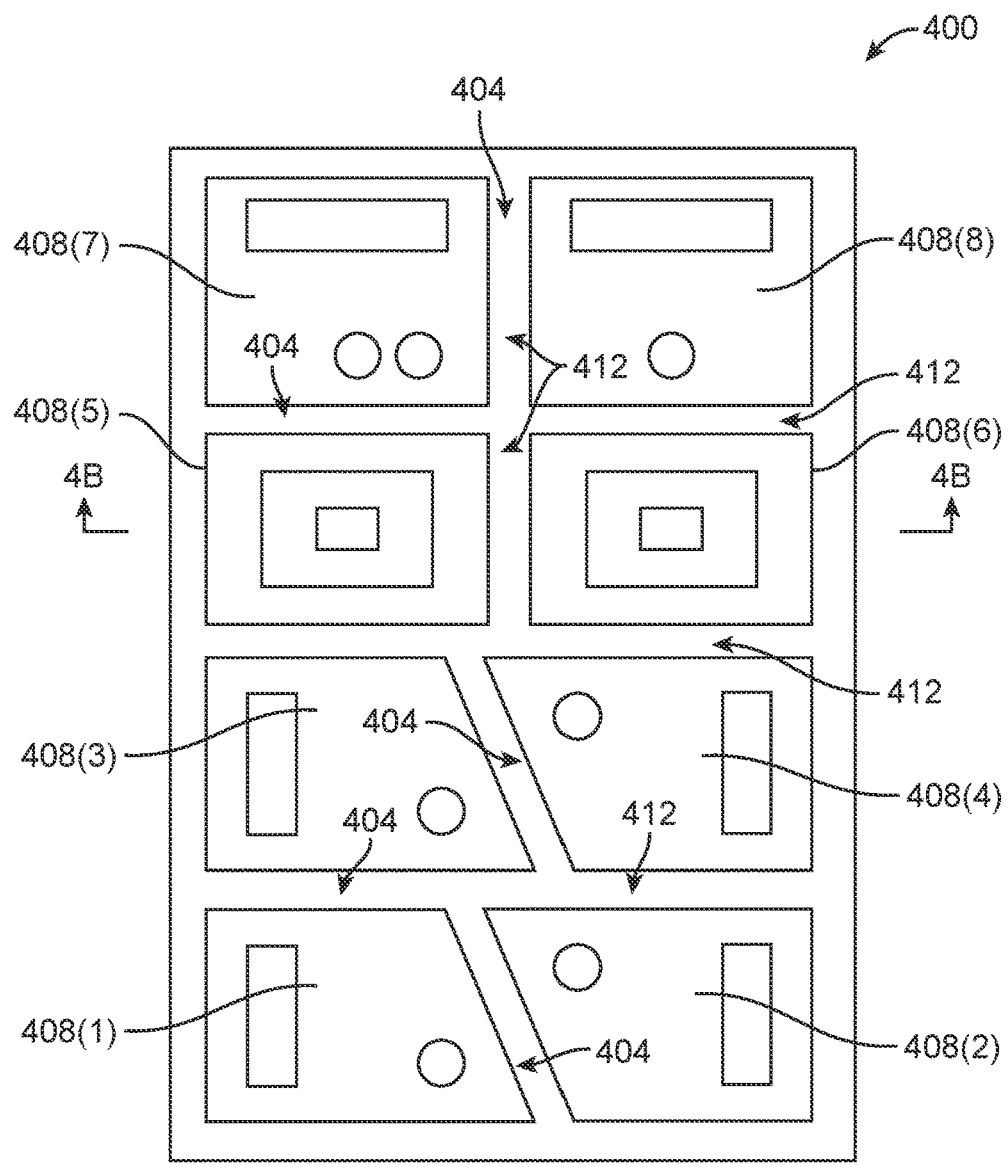
FIG. 4A is a plan view of the first side of a workpiece modeled in the workpiece model of FIGS. 3A and 3B after forming valleys in the workpiece that partially define the plurality of discrete objects.
Figure 4B:
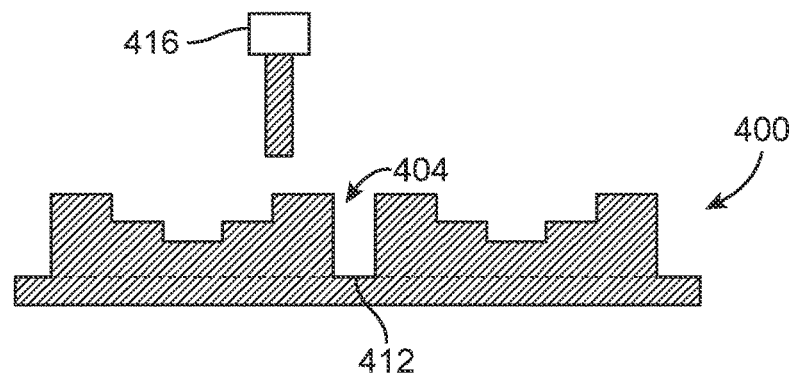
FIG. 4B is a cross-sectional view as taken along line 4B-4B of FIG. 4A.

FIGS. 4A and 4B illustrate the state of workpiece 400 after the subtractive manufacturing that occurs at step 110 of FIG. 1. As seen in FIGS. 4A and 4B, in step 110 material is removed from workpiece 400 to define valleys 404 between partially formed objects 408(1) to 408(8) in the workpiece that correspond to portions of inter-object regions 312 between object computer models 304(1) to 304(8) as defined in workpiece model 300 of FIGS. 3A and 3B. In the example shown, valleys 404 do not extend all the way through the thickness of workpiece 400 at any location. Consequently, valleys 404 define interconnecting portions, here continuous bridging 412, between partially formed objects 408(1) to 408(8). In the example shown, the thickness, Tb, of continuous bridging 412 is equal to or slightly less than the minimum depth, Do, that must be removed from the reverse side of workpiece 400, i.e., the side of the workpiece opposite from the side (i.e., obverse side) containing valleys 404. Setting the thickness Tb of continuous bridging 412 (or partial bridging in other embodiments) in this way can provide for simplified material removal at step 125 of FIG. 1. Those skilled in the art will readily appreciate that workpiece computer model 300 and/or any subsequently created CAM model(s) may include information for forming valleys 404 and corresponding continuous bridging 412. In the example shown, the subtractive manufacturing process used for removing material at step 110 is a rotary milling process performed using a rotary milling machine, as represented by rotary milling tool 416. In other embodiments, one or more other subtractive manufacturing processes may be used to form valleys 404.

Figure 5A:
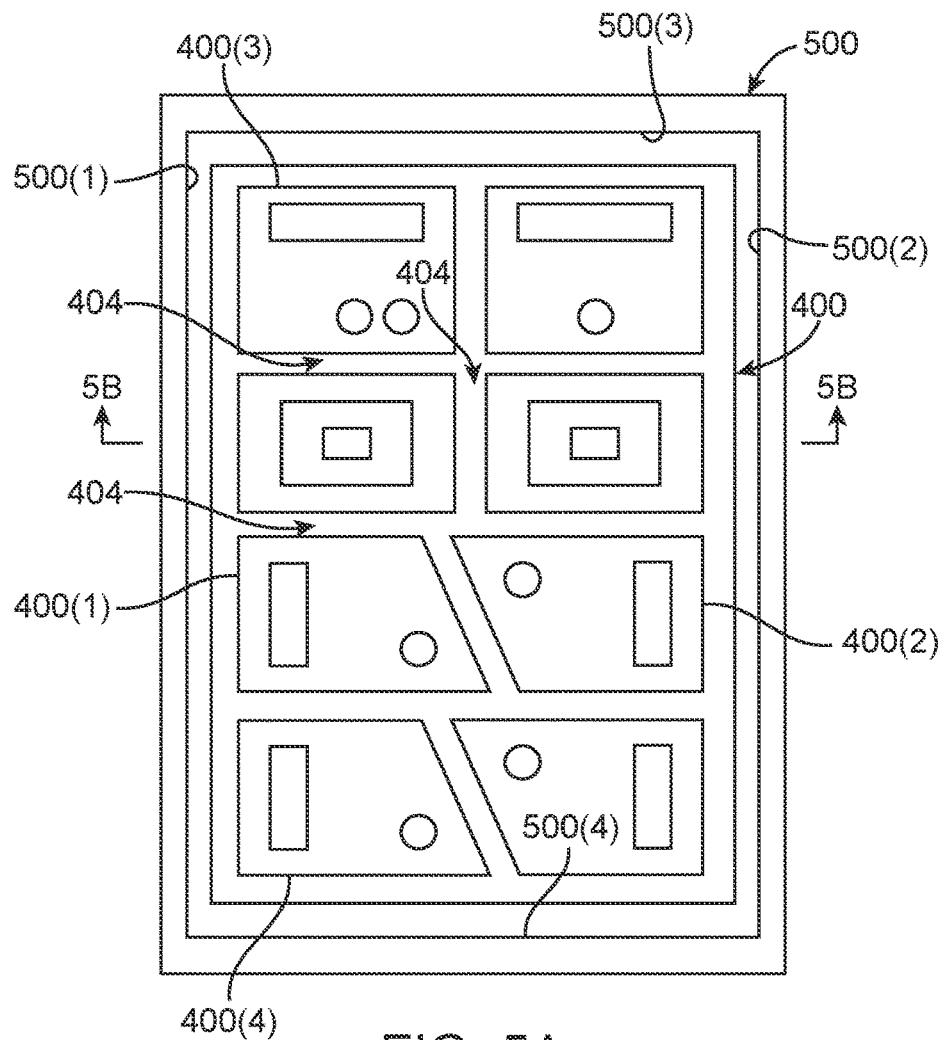
FIG. 5A is a plan view of the workpiece of FIGS. 4A and 4B located in a mold for installing a removable fixating material to stabilize the workpiece during subsequent manufacturing operations.
Figure 5B:
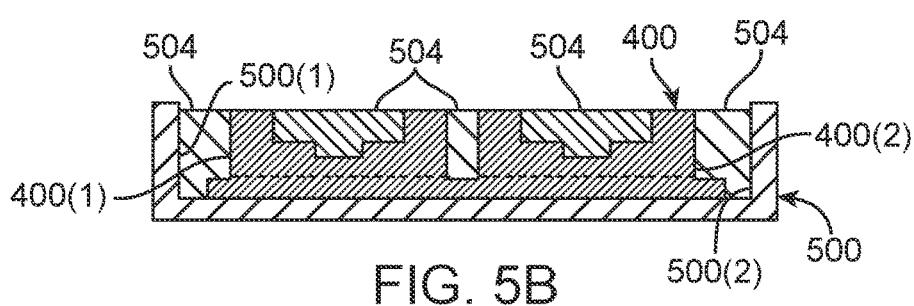
FIG. 5B is a cross-sectional view as taken along line 5B-5B of FIG. 5A.
Figure 5C:
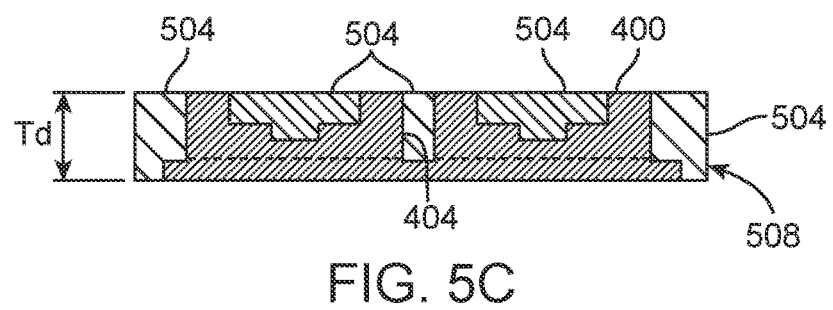
FIG. 5C is a cross-sectional view similar to the cross-sectional view of FIG. 5B but with the mold removed.

FIGS. 5A to 5C illustrate an exemplary manner in which a temporary and removable fixating material can be installed in a workpiece at step 115 of FIG. 1. Referring first to FIG. 5A, following step 110 of FIG. 1, workpiece 400 may be placed in a mold 500, or, alternatively, the mold can be placed around the workpiece, for example, with valleys 404 opening upward. In this example, sidewalls 500(1) to 500(4) of mold 500 are spaced from the lateral sides 400(1) to 400(4) to create regions for the removable fixating material 504 (FIGS. 5B and 5C). As seen in FIG. 5B, removable fixating material 504 is installed into mold 500 and into valleys 404 to an appropriate depth, which may be less than, equal to, or greater than the greatest thickness, Td, of workpiece 400 remaining after subtractive manufacturing at step 110 of FIG. 1. That said, in this example, removable fixating material 504 is installed to a depth less than the greatest thickness Td of workpiece 400. Once removable fixating material 504 has sufficiently hardened, the stabilized workpiece 508 (i.e., workpiece 400 plus installed removable fixating material 504) is removed from mold 500 or, alternatively, the mold is removed from the stabilized workpiece. Stabilized workpiece 508 is illustrated free of mold 500 in FIG. 5C.

Figure 6A:
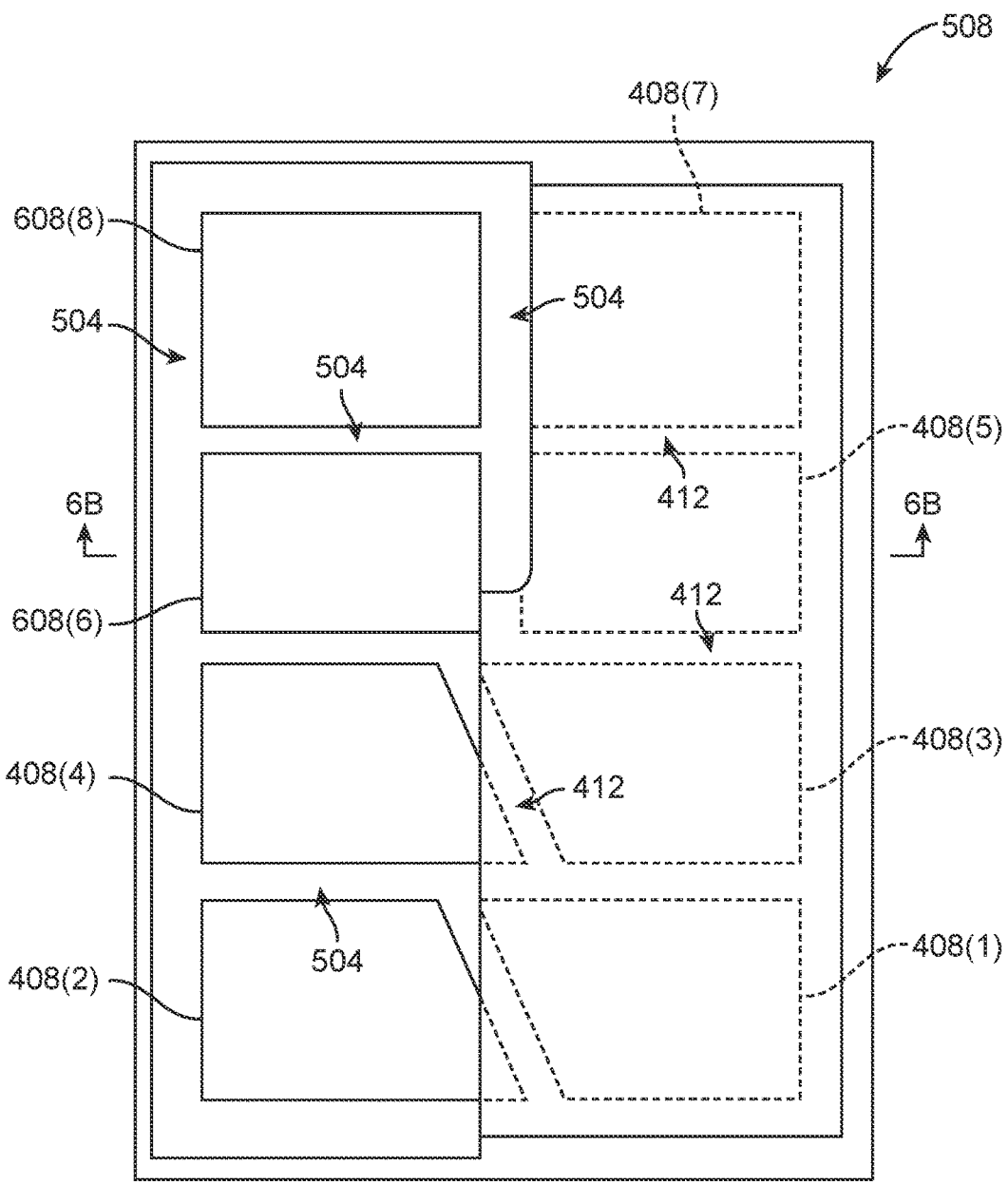
FIG. 6A is a plan view of the second side of the stabilized workpiece after removing some material from the second side of the stabilized workpiece so as to remove the interconnecting portions spanning between adjacent ones of partially formed objects in the stabilized workpiece.
Figure 6B:
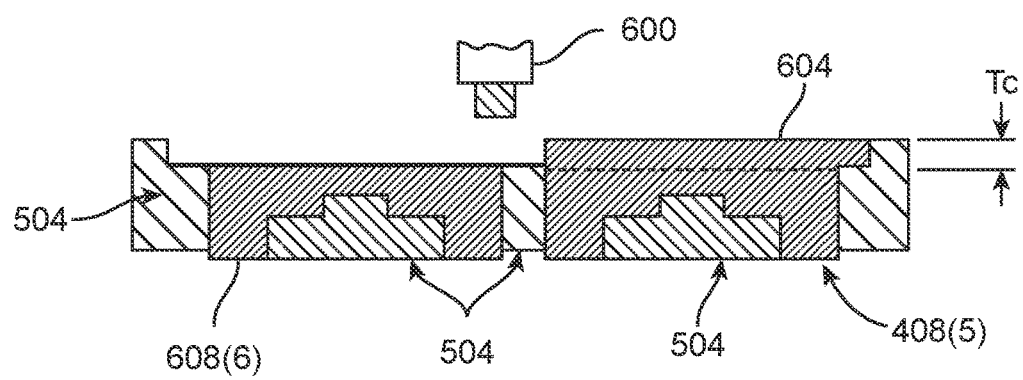
FIG. 6B is a cross-sectional view as taken along line 6B-6B of FIG. 6A.
Figure 7:
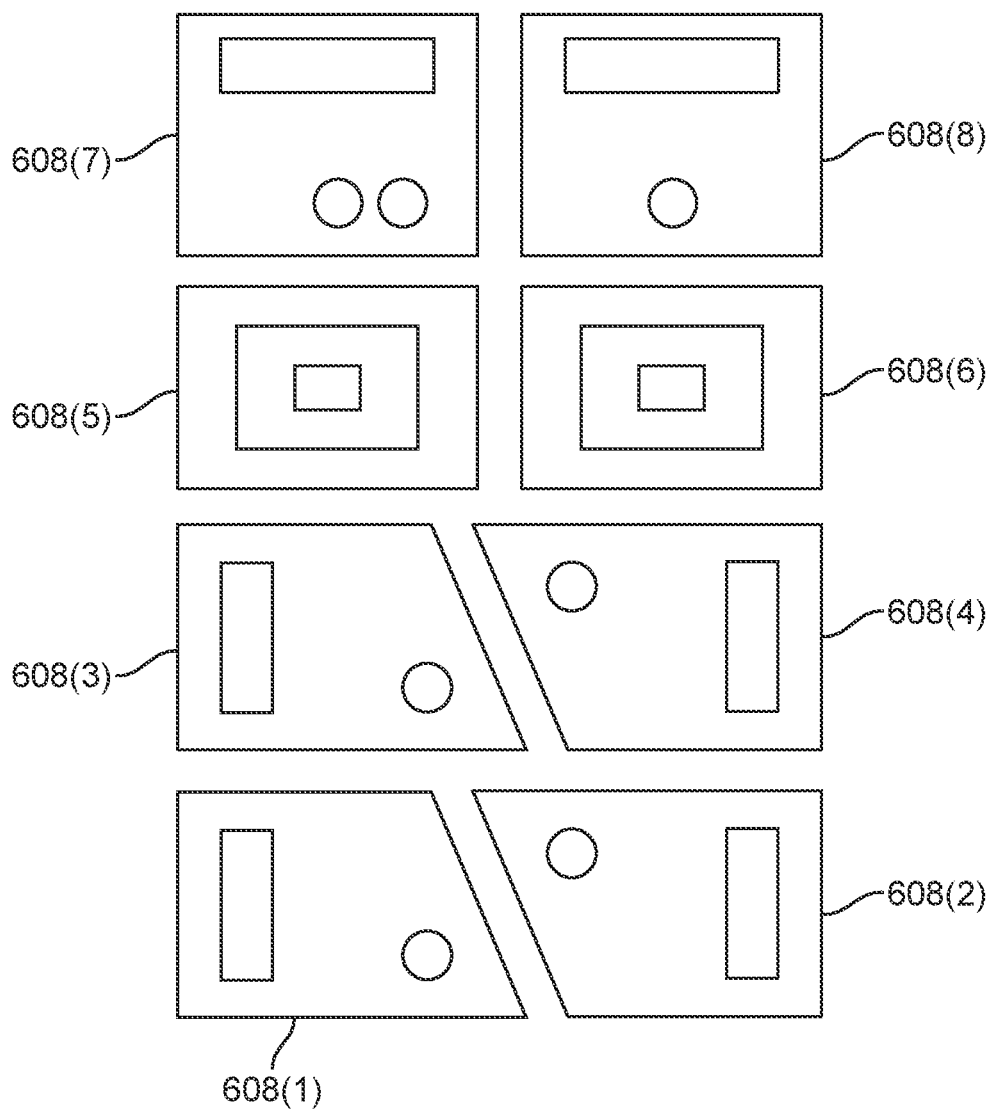
FIG. 7 is a plan view of the discrete objects after removing the removable fixating material from the stabilized workpiece of FIGS. 6A and 6B after removing all interconnecting portions.

FIG. 6A illustrates stabilized workpiece 508 partway through step 125 of removing the interconnecting portions, here continuous bridging 412, between partially formed objects 408(1) to 408(8) (only appropriate ones labeled) using one or more subtractive manufacturing processes. In this example, the process of removing continuous bridging 412 is a rotary-tool machining operation performed by a rotary milling tool 600 that removes a "layer" 604 of constant thickness, Tc, across the entire reverse side of stabilized workpiece 508. As noted above, continuous bridging 412 can be removed in another manner as desired. However, removing such a constant-thickness layer can gain certain economies in the machining process. FIG. 6B illustrates that partially formed objects 408(1) to 408(8) (FIGS. 4A and 4B) are now, or will become when step 125 is completed, discrete objects 608(1) to 608(8) (only appropriate ones labeled) held together only by removable fixating material 504. In the example shown, portions of removable fixating material 504 adjacent to layer 604 are not machined away, but could be if desired. FIG. 7 illustrates stabilized workpiece 508 (FIGS. 5A-5C) at step 130 of FIG. 1 after removal of removable fixating material 504, thereby leaving only discrete objects 608(1) to 608(8).

Figure 8A:
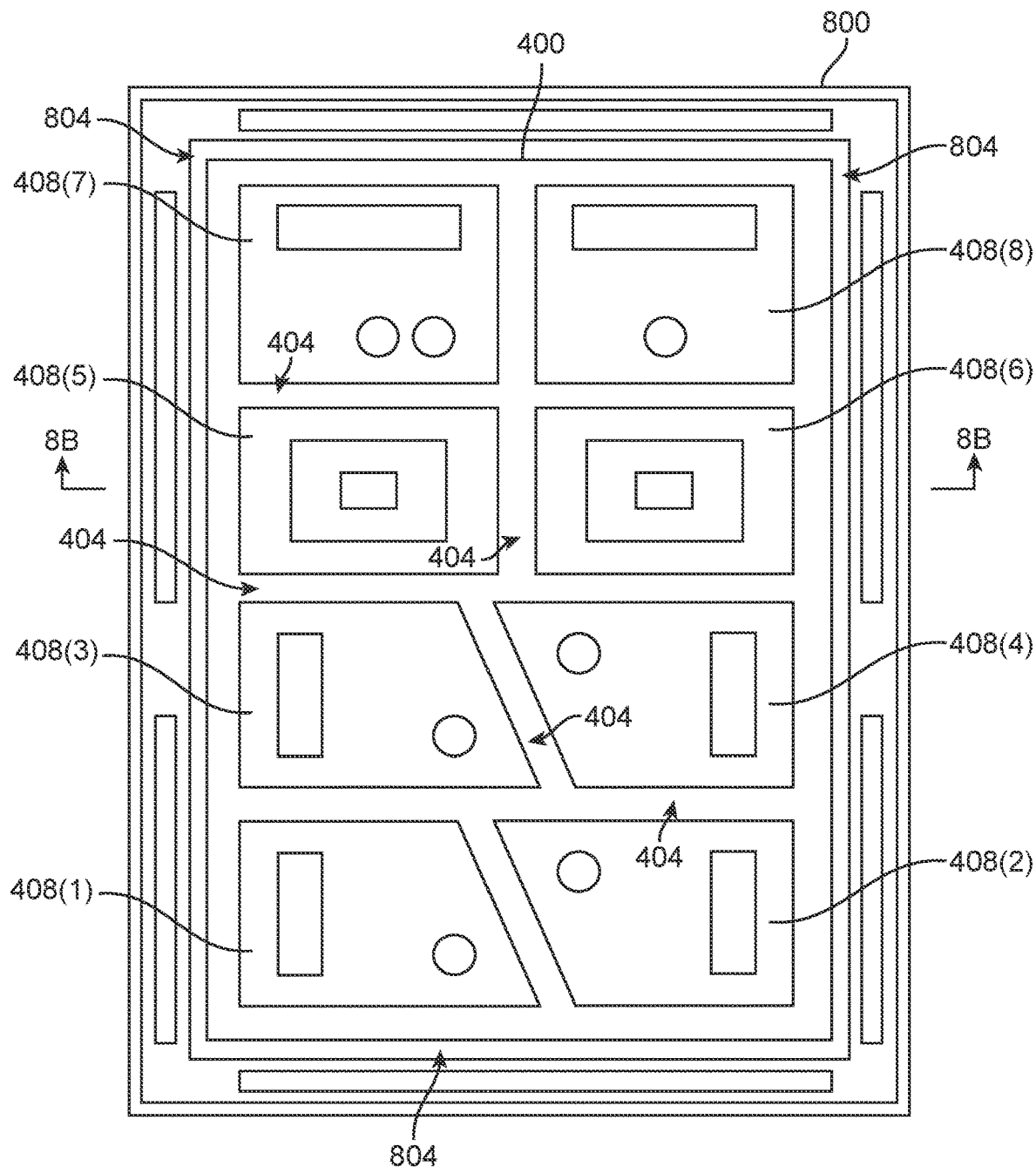
FIG. 8A is a plan view of the workpiece of FIGS. 4A and 4B located in a temporary prefabricated frame prior to installing a removable fixating material to stabilize the workpiece during subsequent manufacturing operations.
Figure 8B:
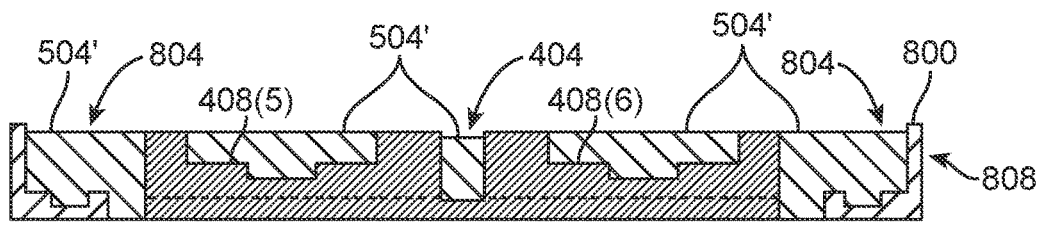
FIG. 8B is a cross-sectional view as taken along line 8B-8B of FIG. 8A after installing the removable fixating material to create a framed stabilized workpiece.

Whereas the first example illustrates various steps of method 100 of FIG. 1 and the resulting structures in a frameless scenario, this next example utilizes a temporary frame 800, as seen in FIGS. 8A and 8B, that in one sense take the place of mold 500 (FIGS. 5A and 5B) but that can also provide one or more benefits, such as any one or more of the benefits described above in connection with the description of step 120 of FIG. 1. In this temporary-frame scenario, steps 105 and 110 of FIG. 1, and correspondingly FIGS. 2 through 4B, may be the same as in the frameless scenario described above. However, instead of using mold 500 (FIGS. 5A and 5B) for installing removable fixating material 504, at optional step 120, temporary frame 800 (FIGS. 8A and 8B) is provided around workpiece 400, and at step 115 removable fixating material 504' is installed in valleys 404 between adjacent ones of partially formed objects 408(1) to 408(8) and in spaces 804 between the temporary frame and partially formed objects 408(1) to 408(8). When removable fixating material 504' has hardened, workpiece 400 and temporary frame 800 comprise a framed stabilized workpiece 808. In this example, removable fixating material 504' is provided to a depth slightly less than thickness Td (FIG. 5B) of workpiece 400, but it could be provided to a greater or lesser depth as desired. In some embodiments, temporary frame 800 may include one or more reference datums that can be used to ensure proper location of workpiece 400 for properly performing one or more subtractive manufacturing processes.

Figure 9A:
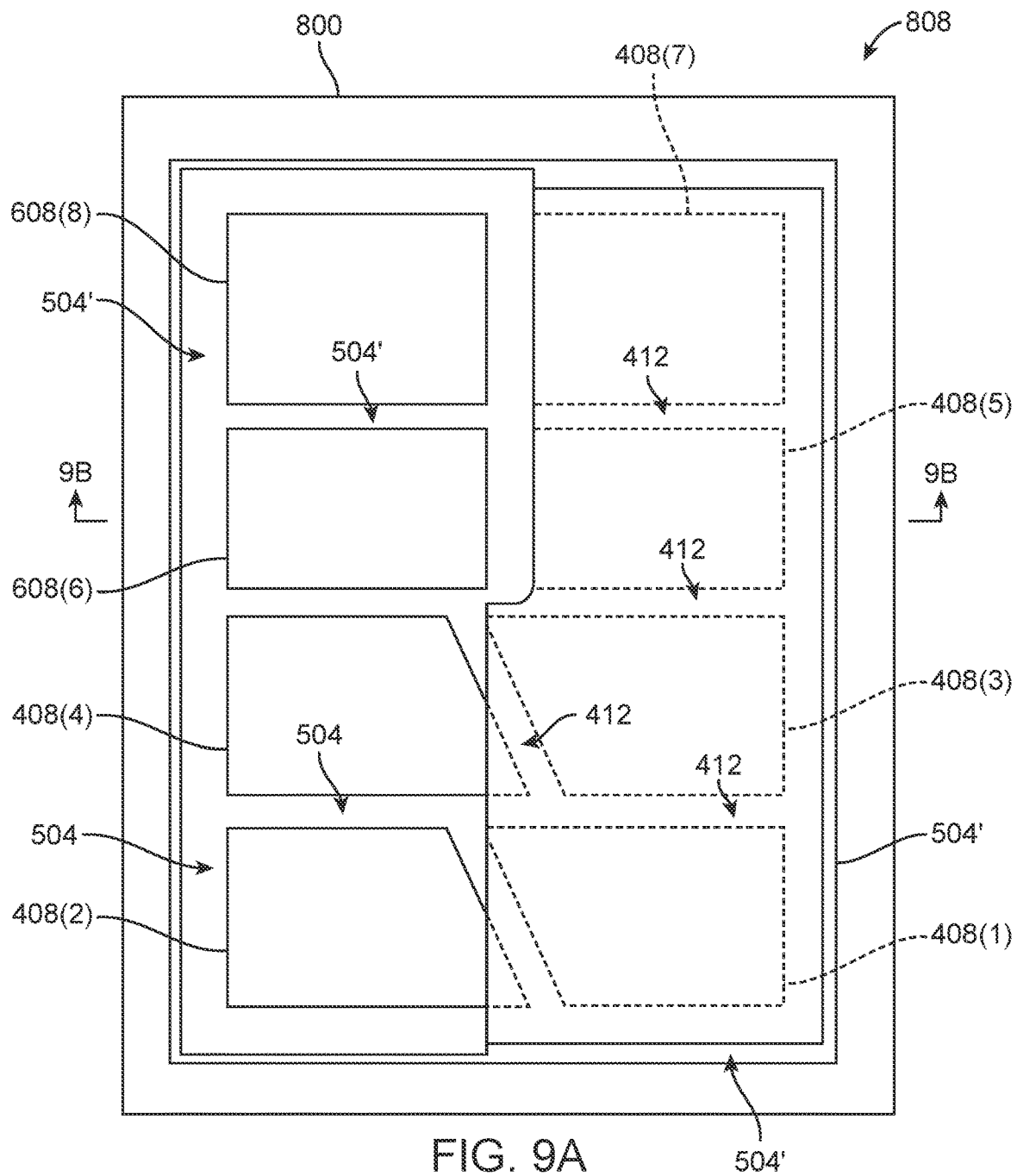
FIG. 9A is a plan view of the second side of the framed stabilized workpiece after removing some material from the second side of the framed stabilized workpiece so as to remove the interconnecting portions spanning between adjacent ones of partially formed objects in the stabilized workpiece.
Figure 9B:
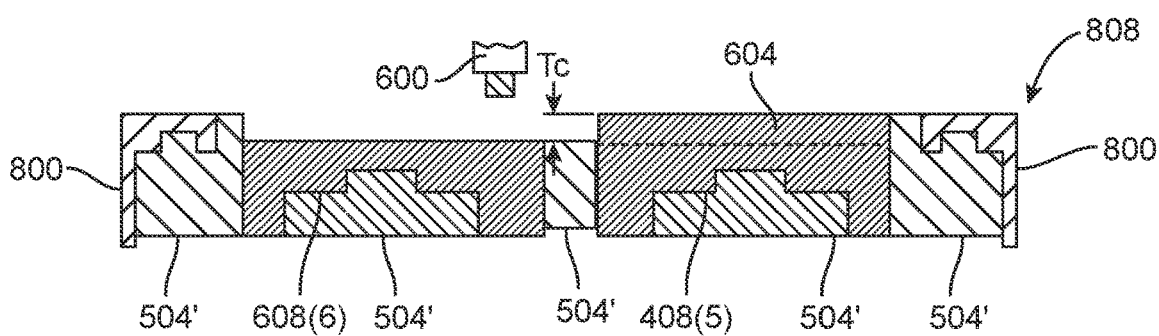
FIG. 9B is a cross-sectional view as taken along line 9B-9B of FIG. 9A.
Figure 10:
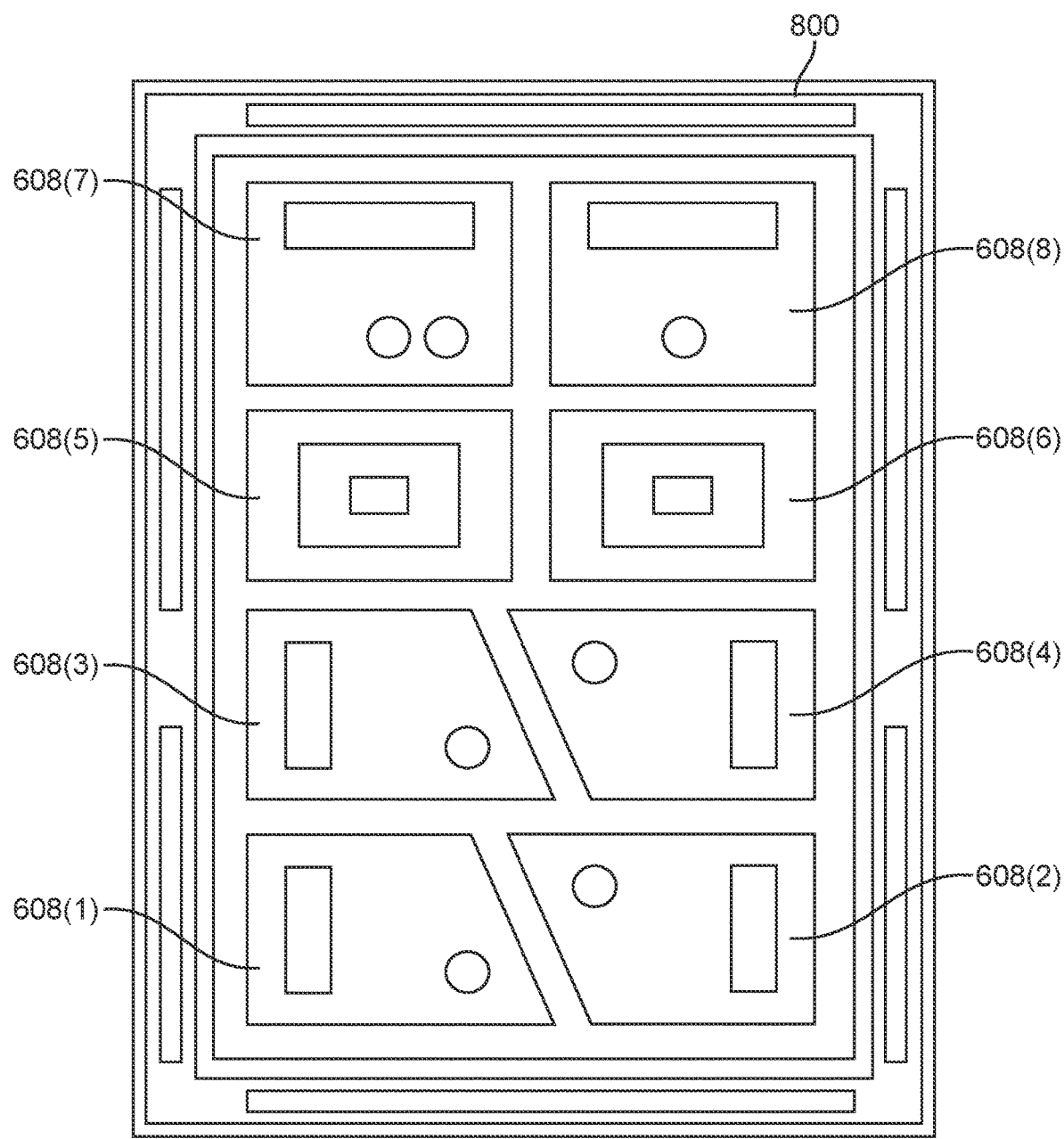
FIG. 10 is a plan view of the discrete objects and temporary workpiece after removing the removable fixating material from the framed stabilized workpiece of FIGS. 8A and 8B after removing all interconnecting portions.

FIG. 9A illustrates framed stabilized workpiece 808 partway through step 125 of removing the interconnecting portions, here continuous bridging 412, between partially formed objects 408(1) to 408(8) (only appropriate ones labeled) using one or more subtractive manufacturing processes. In this example, the process of removing continuous bridging 412 is a rotary-tool machining operation performed by rotary milling tool 600 that removes layer 604 of constant thickness, Tc, across the entire reverse side of stabilized workpiece 808. As noted above, continuous bridging 412 can be removed in another manner as desired. However, removing such a constant-thickness layer can gain certain economies in the machining process. FIG. 9B illustrates that partially formed objects 408(1) to 408(8) (FIGS. 4A and 4B) are now, or will become when step 125 is completed, discrete objects 608(1) to 608(8) (only appropriate ones labeled) held together only by removable fixating material 504'. In the example shown, portions of removable fixating material 504' adjacent to layer 604 are not machined away, but could be if desired. FIG. 10 illustrates framed stabilized workpiece 804 (FIGS. 8A and 8B) at step 130 of FIG. 1 after removal of removable fixating material 504', thereby leaving only discrete objects 608(1) to 608(8) and temporary frame 800, which can be reused or recycled as desired.

Figure 11A:
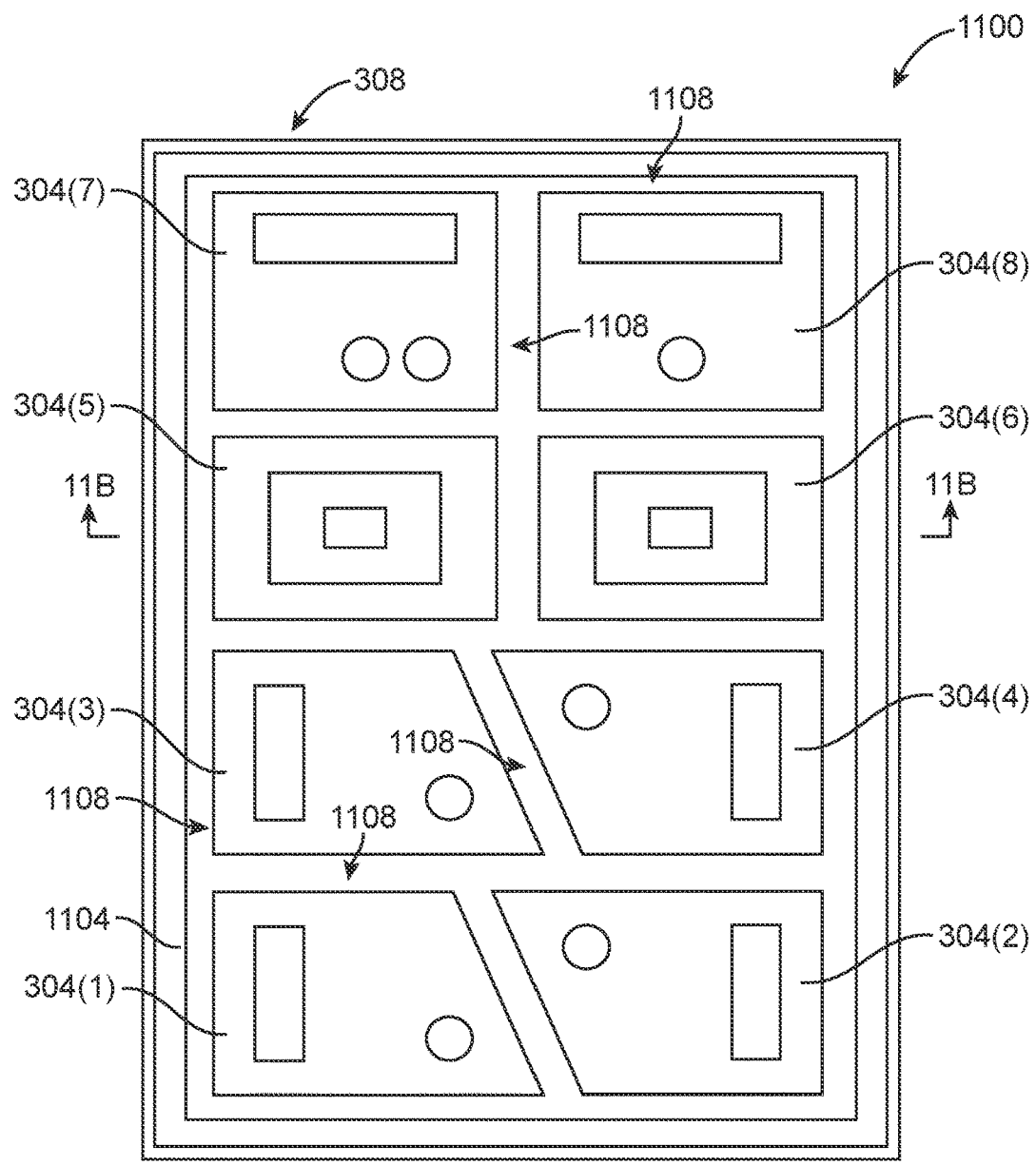
FIG. 11A is a plan view of a computer model of a workpiece composed of a computer model of a temporary frame, selected in coordination with the rectangular slab of FIG. 2, and multiple computer models of several types of objects to be formed from the rectangular slab.
Figure 11B:
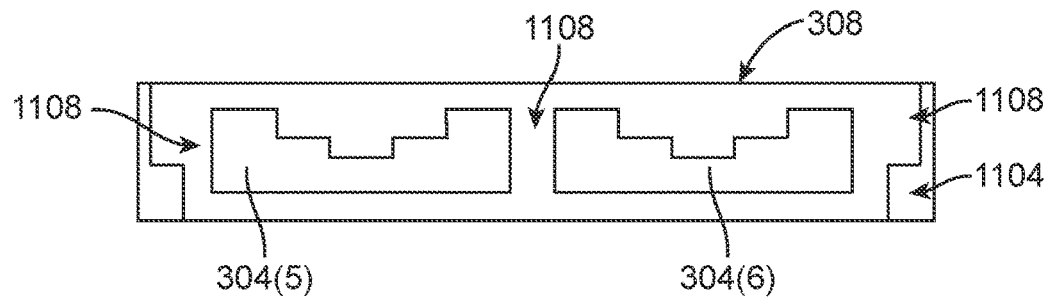
FIG. 11B is a cross-sectional view as taken along line 11B-11B of FIG. 11A.

FIGS. 11A to 15 illustrate another scenario involving a temporary frame, but in this example the temporary frame is effectively formed from the same body of material from which the objects at issue are subtractively manufactured. Referring first to FIGS. 11A and 11B, a workpiece model 1100 of a workpiece 1200 (FIGS. 12A and 12B) is created at step 105 that includes not only slab computer model 308 and object computer models 304(1) to 304(8) described above in connection with FIGS. 3A and 3B, but also includes a frame computer model 1104 of a temporary frame 1500 (FIG. 15) that will ultimately be subtractively manufactured along with discrete object 608(1) to 608(8) in this example. Object computer models 304(1) to 304(8) and frame computer model 1104 are located relative to one another to form inter-structure regions 1108 that will become spaces that separate discrete objects 608(1) to 608(8) and frame 1500 (FIG. 15) after subtractive manufacturing.

In one embodiment, to create workpiece model 1100, a user using computer modeling software, such as a CAM software, CAD software, or other software, may locate, for example, via graphical representations on one or more graphical displays, object computer models 304(1) to 304(8) relative to frame computer model 1104 to achieve the desired arrangement of the object computer models within the frame computer model. Depending on the workflow selected, the user may locate frame computer model 1104 relative to slab computer model 308, or vice versa, before locating object computer models 304(1) to 304(8) relative to the frame computer model, or, alternatively, the user may locate the object computer models relative the frame computer model before locating the combination of the object and frame computer models relative to the slab computer model, or vice versa. It is noted that rectangular slab 200 of FIG. 2 can be used to make discrete objects 608(1) to 608(8) and temporary frame 1500 (FIG. 15) despite the discrete objects in stabilized workpiece 804 (FIGS. 8A and 8B) being close to the edges of the rectangular slab by, for example, reducing the spacing between adjacent ones of described objects (and corresponding object computer models 304(1) to 304(8). It is noted that optional step 120 of FIG. 1 is subsumed in step 105 of creating workpiece computer model 1100 via frame computer model 1104. Optional step 120 of FIG. 1 is also subsumed in the subtractive manufacturing steps 110 and steps 125 as temporary frame 1500 (FIG. 15) is formed by the subtractive manufacturing process(es) used at those steps.

Figure 12A:
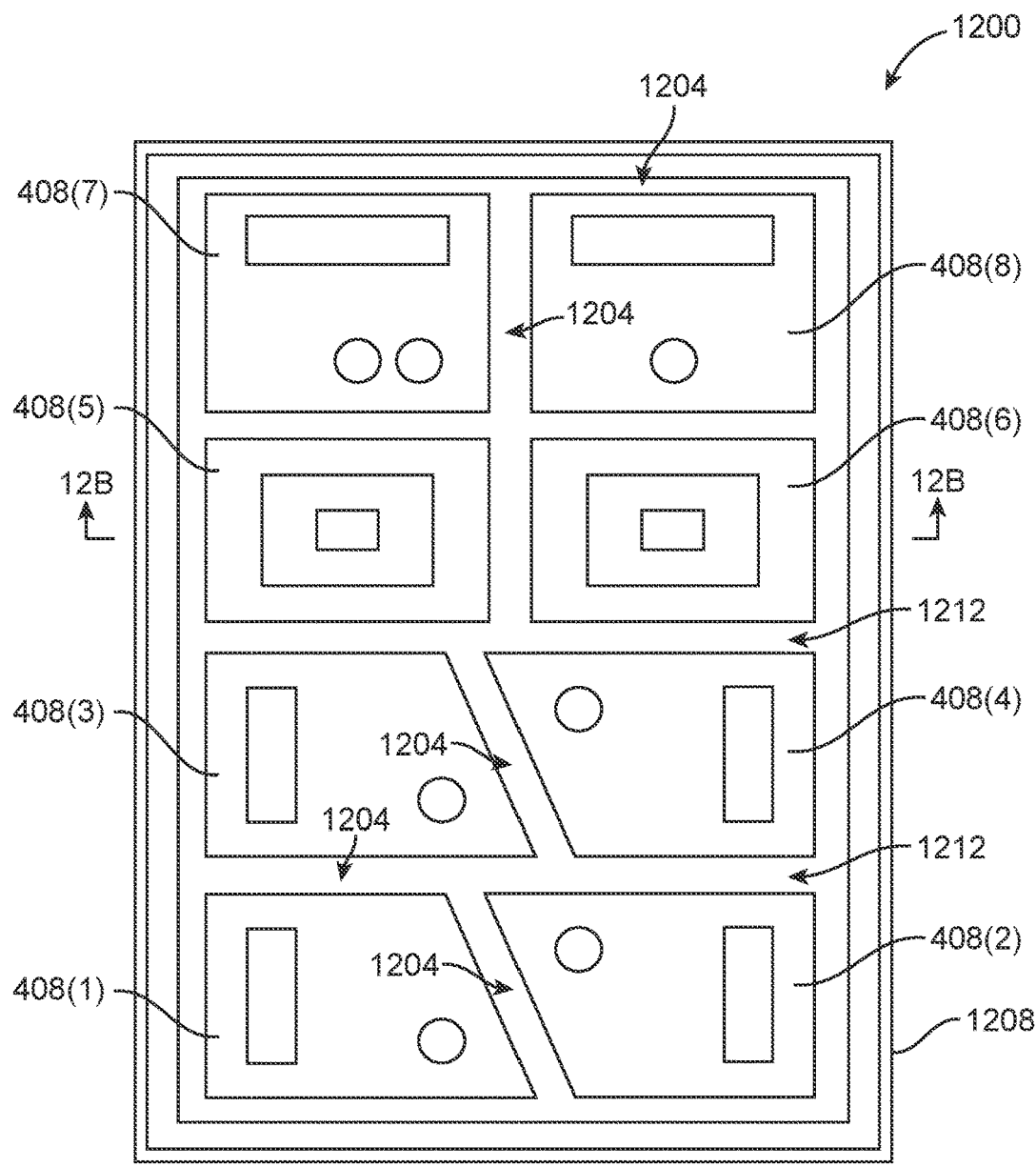
FIG. 12A is a plan view of the first side of the workpiece of the model of FIGS. 11A and 11B after forming valleys in the workpiece that partially define the plurality of discrete objects.
Figure 12B:
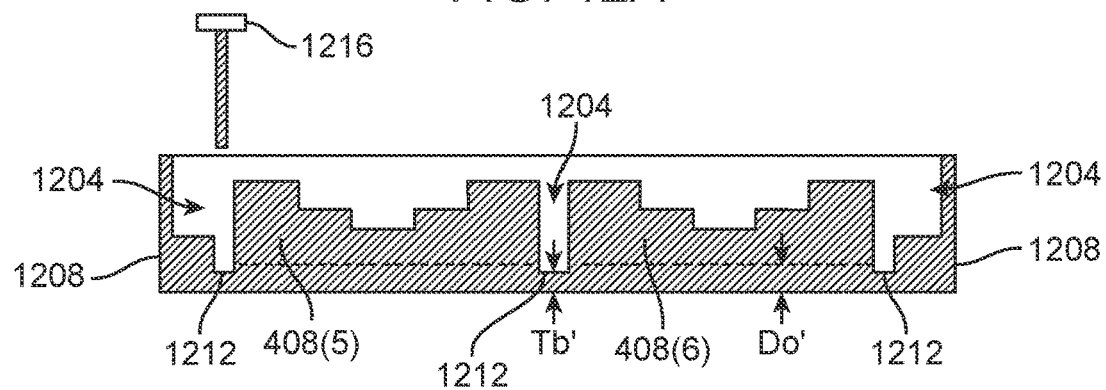
FIG. 12B is a cross-sectional view as taken along line 12B-12B of FIG. 12A.

FIGS. 12A and 12B illustrate the state of workpiece 1200 after the subtractive manufacturing that occurs at step 110 of FIG. 1. As seen in FIGS. 12A and 12B, in step 110 material is removed from workpiece 1200 to define valleys 1204 between partially formed objects 408(1) to 408(8) and partially formed frame 1208 in the workpiece that correspond to portions of inter-structure regions 1108 between object computer models 304(1) to 304(8) and frame computer model 1104 as defined in workpiece model 1100 of FIGS. 11A and 11B. In the example shown, valleys 1204 do not extend all the way through the thickness of workpiece 1200 at any location. Consequently, valleys 1204 define interconnecting portions, here continuous bridging 1212, between partially formed objects 408(1) to 408(8) and between the partially formed objects and partially formed frame 1208. In the example shown, the thickness, Tb', of continuous bridging 1212 is equal to or slightly less than the minimum depth, Do', that must be removed from the reverse side of workpiece 1200, i.e., the side of the workpiece opposite from the side (i.e., obverse side) containing valleys 1204. Setting the thickness Tb' of continuous bridging 1212 (or partial bridging in other embodiments) in this way can provide for simplified material removal at step 125 of FIG. 1. Those skilled in the art will readily appreciate that workpiece computer model 1200 and/or any subsequently created CAM model(s) may include information for forming valleys 1204 and corresponding continuous bridging 1212. In the example shown, the subtractive manufacturing process used for removing material at step 110 is a rotary milling process performed using a rotary milling machine, as represented by rotary milling tool 1216. In other embodiments, one more other subtractive manufacturing processes may be used to form valleys 1204.

Figure 13A:
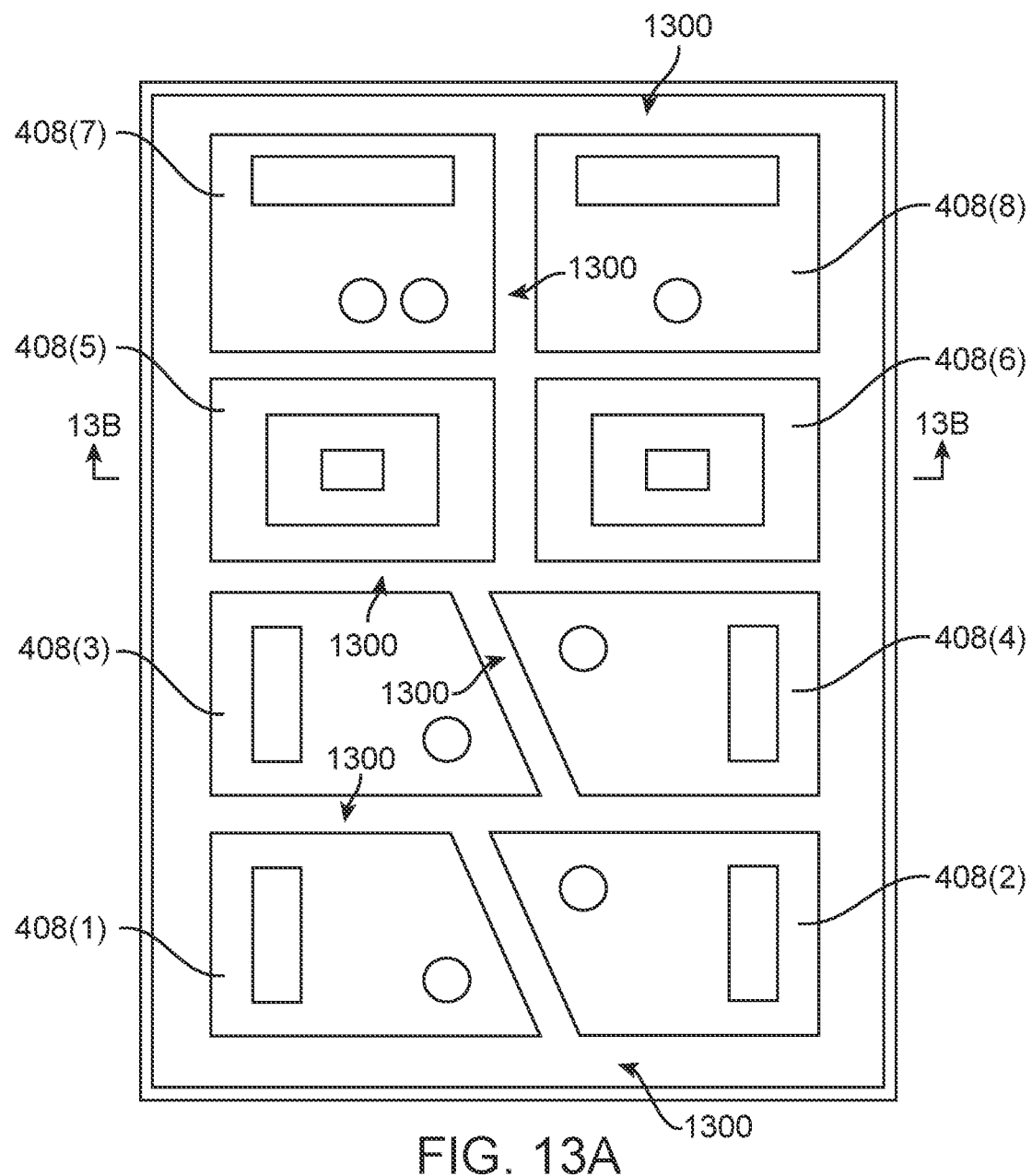
FIG. 13A is a plan view of the workpiece of FIGS. 12A and 12B having a removable fixating material installed to stabilize the workpiece during subsequent manufacturing operations.
Figure 13B:
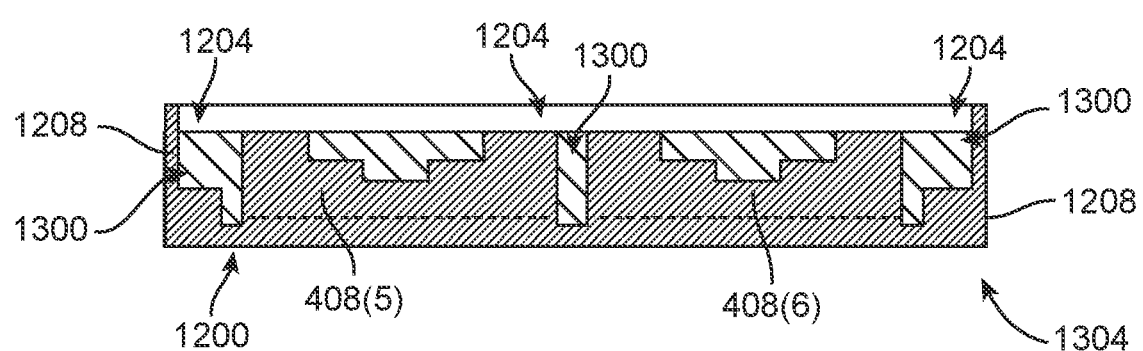
FIG. 13B is a cross-sectional view as taken along line 13B-13B of FIG. 13A.

FIGS. 13A and 13B illustrate installing a temporary and removable fixating material 1300 in workpiece 1200 at step 115 of FIG. 1. Since partially formed frame 1208 is integral with workpiece 1200, removable fixating material 1300 need only be installed into valleys 1204 to an appropriate depth, which may be less than, equal to, or greater than the greatest thickness, Td, of workpiece 1200 remaining after subtractive manufacturing at step 110 of FIG. 1. That said, in this example, removable fixating material 1300 is installed to a depth less than the greatest thickness Td of workpiece 1200. Once removable fixating material 1300 has sufficiently hardened, the stabilized workpiece 1304 (i.e., workpiece 1200 plus installed removable fixating material 1300) may be ready for processing at step 125 of FIG. 1.

Figure 14A:
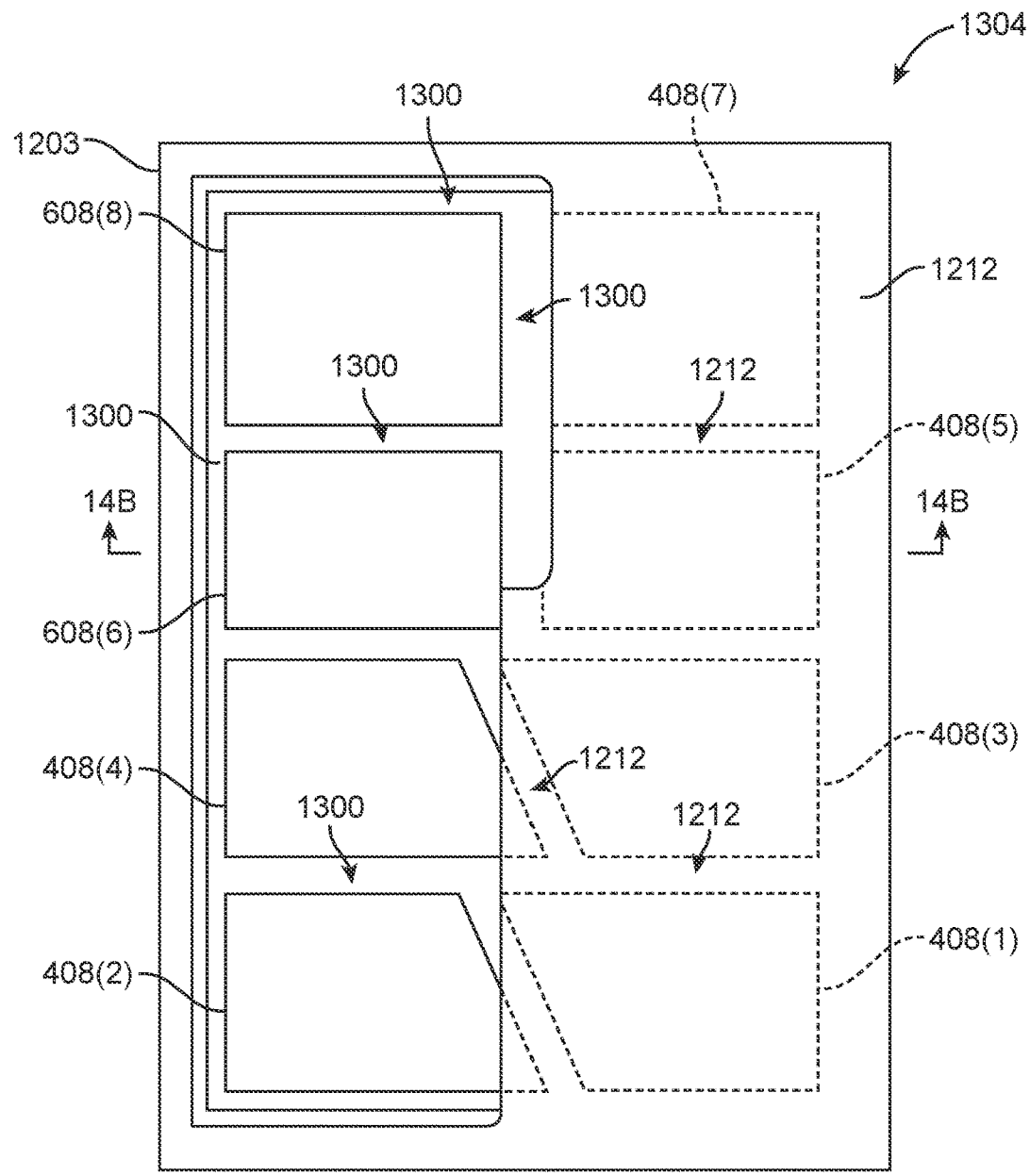
FIG. 14A is a plan view of the second side of the stabilized workpiece after removing some material from the second side of the stabilized workpiece so as to remove the interconnecting portions spanning between adjacent ones of partially formed objects in the stabilized workpiece.
Figure 14B:
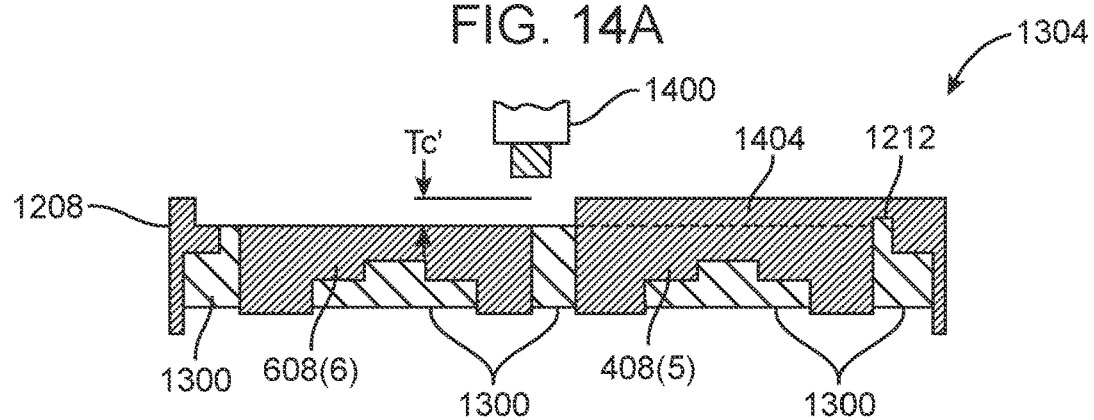
FIG. 14B is a cross-sectional view as taken along line 14B-14B of FIG. 14A.
Figure 15:
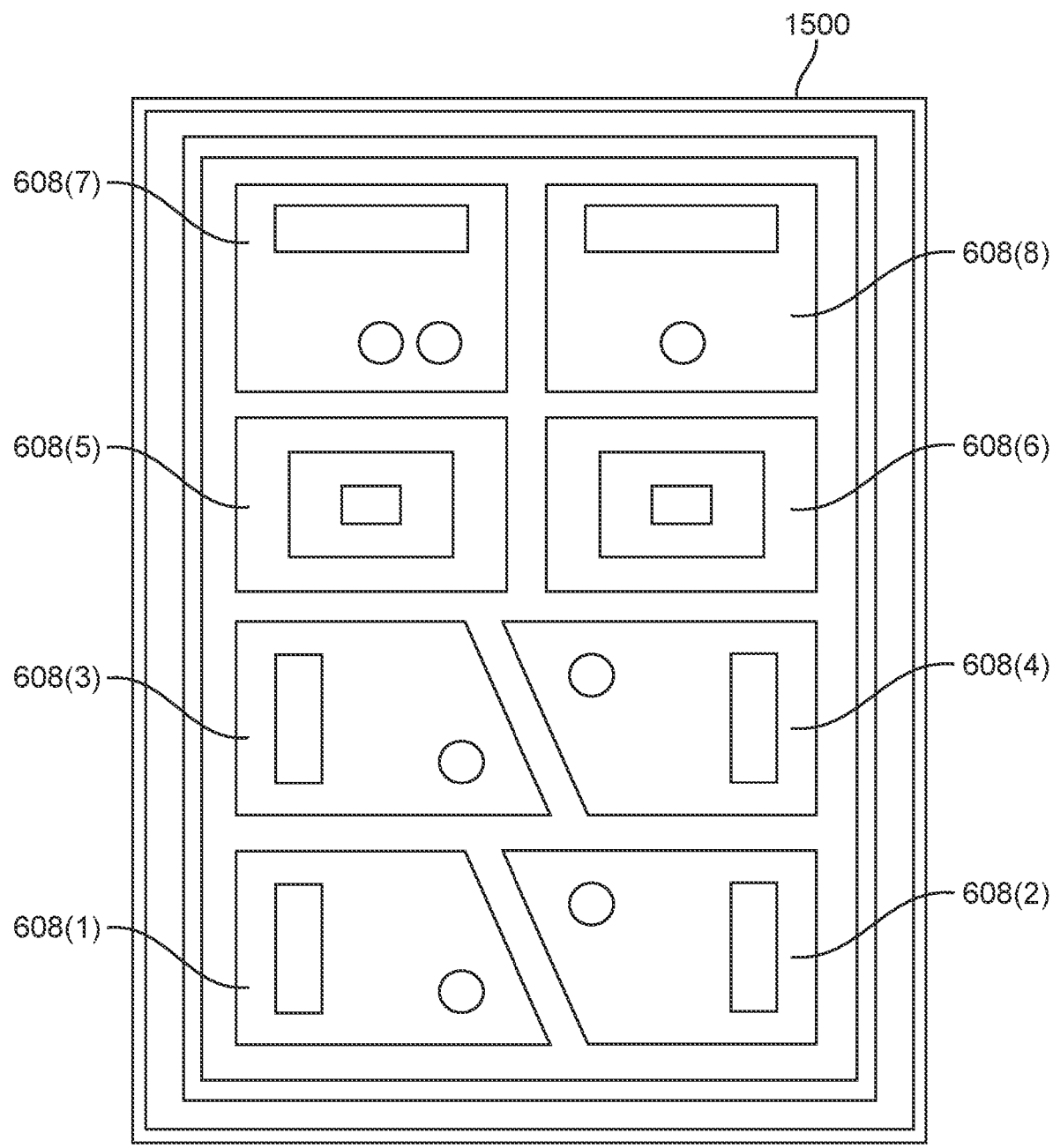
FIG. 15 is a plan view of the discrete objects after removing the removable fixating material from the stabilized workpiece of FIGS. 14A and 14B after removing all interconnecting portions.

FIG. 14A illustrates stabilized workpiece 1304 partway through step 125 of removing the interconnecting portions, here continuous bridging 1212, between partially formed objects 408(1) to 408(8) (only appropriate ones labeled) and partially formed frame 1208 using one or more subtractive manufacturing processes. In this example, the process of removing continuous bridging 1212 is a rotary-tool machining operation performed by a rotary milling tool 1400 that, in this example, removes a "layer" 1404 of constant thickness, Tc', across the entire reverse side of stabilized workpiece 1304. As noted above, continuous bridging 1212 can be removed in another manner as desired. However, removing such a constant-thickness layer can gain certain economies in the machining process. FIG. 14B illustrates that partially formed objects 408(1) to 408(8) (FIGS. 12A and 12B) and partially formed frame 1208 are now, or will become when step 125 is completed, discrete objects 608(1) to 608(8) (only appropriate ones labeled) and discrete temporary frame 1500 (FIG. 15) held together only by removable fixating material 1300. In the example shown, portions of removable fixating material 1300 adjacent to layer 1404 are not machined away, but could be if desired. FIG. 15 illustrates stabilized workpiece 1304 (FIGS. 13A and 13B) at step 130 of FIG. 1 after removal of removable fixating material 1300, thereby leaving only discrete objects 608(1) to 608(8) and temporary frame 1500, which can be used (such as in the second scenario described above), recycled, or discarded, as desired.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 16:
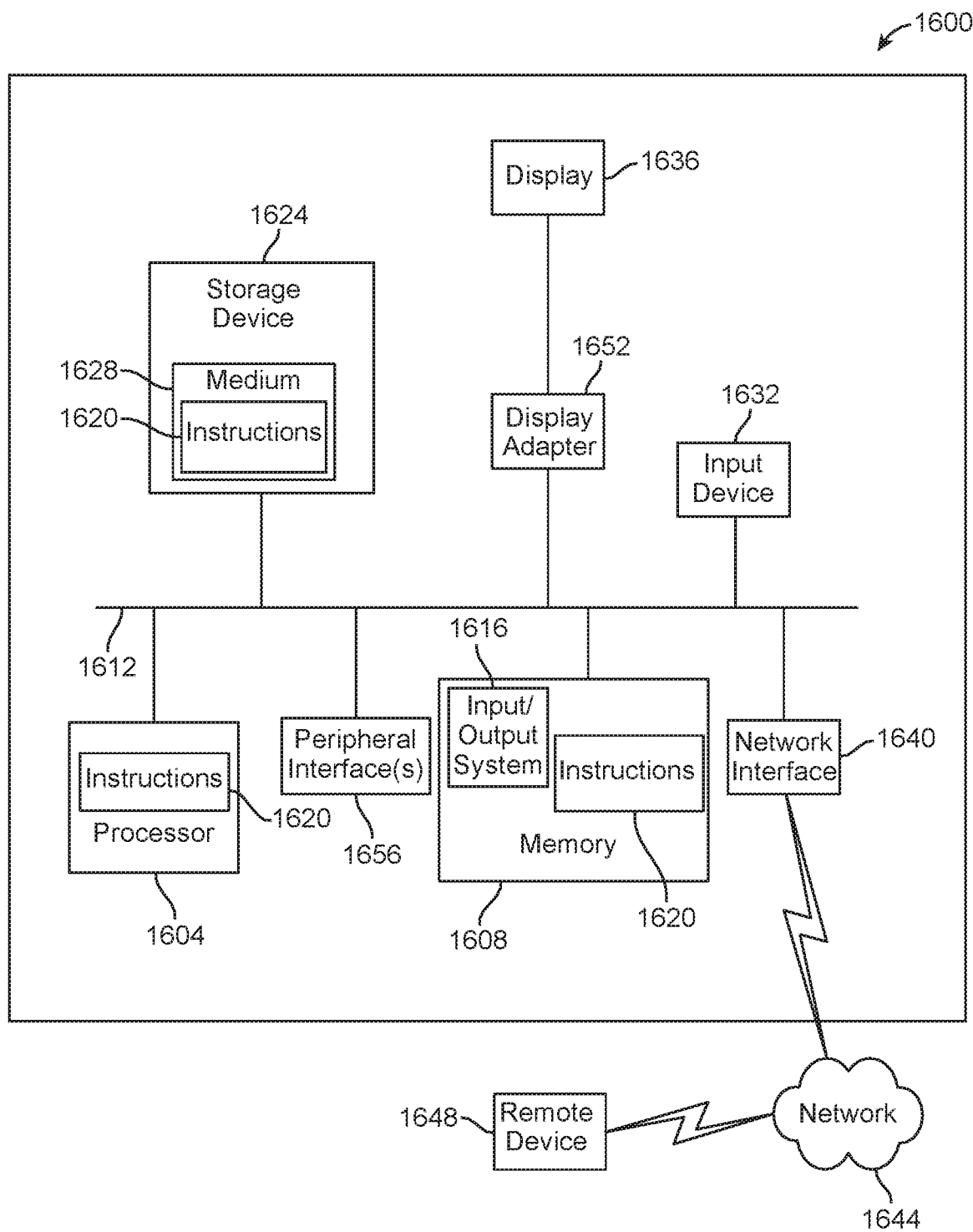
FIG. 16 is a block diagram of a computing system that can be used to implement any one or more of the methodologies disclosed herein and any one or more portions thereof.

FIG. 16 shows a diagrammatic representation of one embodiment of a computing device in the exemplary form of a computer system 1600 within which a set of instructions, such as certain steps of FIG. 1, for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1600 includes a processor 1604 and a memory 1608 that communicate with each other, and with other components, via a bus 1612. Bus 1612 may include any of several types of bus structures including, but not limited to, a memory bus, a memory controller, a peripheral bus, a local bus, and any combinations thereof, using any of a variety of bus architectures.

Memory 1608 may include various components (e.g., machine-readable media) including, but not limited to, a random access memory component, a read only component, and any combinations thereof. In one example, a basic input/output system 1616 (BIOS), including basic routines that help to transfer information between elements within computer system 1600, such as during start-up, may be stored in memory 1608. Memory 1608 may also include (e.g., stored on one or more machine-readable media) instructions (e.g., software) 1620 embodying any one or more of the aspects and/or methodologies of the present disclosure. In another example, memory 1608 may further include any number of program modules including, but not limited to, an operating system, one or more application programs, other program modules, program data, and any combinations thereof.

Computer system 1600 may also include a storage device 1624. Examples of a storage device (e.g., storage device 1624) include, but are not limited to, a hard disk drive, a magnetic disk drive, an optical disc drive in combination with an optical medium, a solid-state memory device, and any combinations thereof. Storage device 1624 may be connected to bus 1612 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1624 (or one or more components thereof) may be removably interfaced with computer system 1600 (e.g., via an external port connector (not shown)). Particularly, storage device 1624 and an associated machine-readable medium 1628 may provide nonvolatile and/or volatile storage of machine-readable instructions, data structures, program modules, and/or other data for computer system 1600. In one example, software 1620 may reside, completely or partially, within machine-readable medium 1628. In another example, software 1620 may reside, completely or partially, within processor 1604.

Computer system 1600 may also include an input device 1632. In one example, a user of computer system 1600 may enter commands and/or other information into computer system 1600 via input device 1632. Examples of an input device 1632 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1632 may be interfaced to bus 1612 via any of a variety of interfaces (not shown) including, but not limited to, a serial interface, a parallel interface, a game port, a USB interface, a FIREWIRE interface, a direct interface to bus 1612, and any combinations thereof. Input device 1632 may include a touch screen interface that may be a part of or separate from display 1636, discussed further below. Input device 1632 may be utilized as a user selection device for selecting one or more graphical representations in a graphical interface as described above.

A user may also input commands and/or other information to computer system 1600 via storage device 1624 (e.g., a removable disk drive, a flash drive, etc.) and/or network interface device 1640. A network interface device, such as network interface device 1640, may be utilized for connecting computer system 1600 to one or more of a variety of networks, such as network 1644, and one or more remote devices 1648 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1644, may employ a wired and/or a wireless mode of communication. In general, any network topology may be used. Information (e.g., data, software 1620, etc.) may be communicated to and/or from computer system 1600 via network interface device 1640.

Computer system 1600 may further include a video display adapter 1652 for communicating a displayable image to a display device, such as display device 1636. Examples of a display device include, but are not limited to, a liquid crystal display (LCD), a cathode ray tube (CRT), a plasma display, a light emitting diode (LED) display, and any combinations thereof. Display adapter 1652 and display device 1636 may be utilized in combination with processor 1604 to provide graphical representations of aspects of the present disclosure. In addition to a display device, computer system 1600 may include one or more other peripheral output devices including, but not limited to, an audio speaker, a printer, and any combinations thereof. Such peripheral output devices may be connected to bus 1612 via a peripheral interface 1656. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Furthermore, the foregoing has been a detailed description of illustrative embodiments of the invention. It is noted that in the present specification and claims appended hereto, conjunctive language such as is used in the phrases "at least one of X, Y and Z" and "one or more of X, Y, and Z," unless specifically stated or indicated otherwise, shall be taken to mean that each item in the conjunctive list can be present in any number exclusive of every other item in the list or in any number in combination with any or all other item(s) in the conjunctive list, each of which may also be present in any number. Applying this general rule, the conjunctive phrases in the foregoing examples in which the conjunctive list consists of X, Y, and Z shall each encompass: one or more of X; one or more of Y; one or more of Z; one or more of X and one or more of Y; one or more of Y and one or more of Z; one or more of X and one or more of Z; and one or more of X, one or more of Y and one or more of Z.

Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve aspects of the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A method of manufacturing a plurality of discrete objects, wherein each discrete object represents at least a partially completed form of at least a part of a finished product, from a body of material having a first side and a second side spaced from the first side, wherein the discrete objects are defined by through-spaces in the body of material extending from the first side to the second side after performing the method, the method comprising:
    forming, by subtractive manufacturing, valleys in the body of material on the first side of the body of material so as to leave interconnecting portions of the body of material that interconnect the plurality of objects to one another, wherein the valleys form portions of the through spaces, wherein the forming of the valleys and interconnecting portions transforms the body of material into a workpiece of interconnected structures comprising precursors to the discrete objects;
    locating a temporary frame laterally surrounding an object region of the body from which all of the discrete objects will be manufactured;
    installing a removable fixating material into the valleys so as to laterally surround the discrete objects and be in contact with the temporary frame so as to form a stabilized workpiece;
    after the fixating material has hardened, removing, using subtractive manufacturing, the interconnecting portions of the stabilized workpiece; and
    after removing the interconnecting portions, removing the removable fixating material so as to liberate the plurality of objects from one another.

2. A method according to claim 1, wherein locating the temporary frame around the body of material includes providing a prefabricated frame separate from the body of material as the temporary frame, the temporary frame having a plurality of features designed and configured to receive the removable fixating material and thereby form a mechanical interlock between the temporary frame and the workpiece of interconnected structures.

3. A method according to claim 1 further comprising, forming by subtractive manufacturing, valleys in the body of material on the second side of the body of material.

4. The method according to claim 1, wherein installing the removable fixating material includes installing the removable fixating material so that the object region is stabilized relative to the temporary frame.

5. A method according to claim 1, wherein locating the temporary frame around the body of material includes providing a prefabricated support frame separate from the body of material as the temporary frame, wherein the temporary frame includes at least one reference feature designed, configured, and located for precisely locating the stabilized workpiece relative to a subtractive manufacturing machine.

6. A method according to claim 5, the method further comprising removing a layer from the second side of the body of material so as to define a planar surface across the entirety of the object regions, wherein the removing of the layer includes removing the interconnecting portions.

7. A method according to claim 1, further comprising:
    subtractively manufacturing the temporary frame from the body of material.

8. A method according to claim 7, wherein subtractively manufacturing the temporary frame includes subtractively manufacturing at least one datum feature designed, configured, and located for precisely locating the stabilized workpiece relative to a subtractive manufacturing machine.

9. A method according to claim 7, wherein subtractively manufacturing the temporary frame from the body of material includes subtractively manufacturing the temporary frame contemporaneously with subtractively manufacturing the workpiece of interconnected structures.

10. A method according to claim 7, wherein subtractively manufacturing the temporary frame includes subtractively manufacturing a plurality of features designed and configured to receive the removable fixating material and thereby form a mechanical interlock between the temporary frame and the workpiece of interconnected structures.

\* \* \* \* \*